(12) United States Patent
Campion et al.

(10) Patent No.: US 10,895,448 B2
(45) Date of Patent: Jan. 19, 2021

(54) SYSTEM AND METHOD FOR COLLECTING MEASUREMENT DATA OF SHAPED COOLING HOLES OF CMC COMPONENTS

(71) Applicant: General Electric Company, Schenectady, NY (US)

(72) Inventors: Sean Allen Campion, Springboro, OH (US); Cody Daniel Burbank, Springboro, OH (US); Joshua Ryan Wilson, Tipp City, OH (US)

(73) Assignee: General Electric Company, Schenectady, NY (US)

( * ) Notice: Subject to any disclaimer, the term of this patent is extended or adjusted under 35 U.S.C. 154(b) by 32 days.

(21) Appl. No.: 16/378,980

(22) Filed: Apr. 9, 2019

(65) Prior Publication Data

US 2020/0326180 A1   Oct. 15, 2020

(51) Int. Cl.
*G01B 11/24*   (2006.01)
(52) U.S. Cl.
CPC .......... *G01B 11/24* (2013.01); *G01B 2210/50* (2013.01)
(58) Field of Classification Search
CPC ............................. G01B 11/24; G01B 2210/50
See application file for complete search history.

(56) References Cited

U.S. PATENT DOCUMENTS

| | | | |
|---|---|---|---|
| 5,773,790 A | 6/1998 | Moore et al. | |
| 5,848,115 A | 12/1998 | Little et al. | |
| 7,388,980 B2 | 6/2008 | Vaidyanathan | |
| 9,250,188 B2 | 2/2016 | Tallman et al. | |
| 9,347,899 B2 | 5/2016 | Henderkott et al. | |
| 9,400,256 B2 | 7/2016 | Henderkott et al. | |
| 9,403,245 B2 | 8/2016 | Arjakine et al. | |
| 9,714,823 B2 | 7/2017 | Muller et al. | |
| 9,760,986 B2 | 9/2017 | Ramamurthy et al. | |
| 2006/0109483 A1* | 5/2006 | Marx | G01B 11/24 356/609 |
| 2007/0153296 A1* | 7/2007 | Schick | A61B 5/0068 356/609 |
| 2008/0257023 A1 | 10/2008 | Jordil et al. | |
| 2011/0013186 A1* | 1/2011 | Miki | G02B 21/0064 356/364 |
| 2015/0260504 A1* | 9/2015 | Schonleber | G01B 11/2441 356/478 |
| 2018/0172427 A1 | 6/2018 | Hoeller et al. | |

* cited by examiner

*Primary Examiner* — Michael A Lyons
(74) *Attorney, Agent, or Firm* — Dority & Manning, P.A.

(57) ABSTRACT

A measurement system and methods for collecting measurement data for features of ceramic matrix composite (CMC) components are provided. In one aspect, the system and methods provided herein can be utilized to collect measurement data for a cooling hole of a CMC component. The measurement system includes a sensor system that includes a chromatic confocal sensor and a charged coupled device. The chromatic confocal sensor emits stacked cones of light each having an associated wavelength. The stacked cones are moved over a target surface of the CMC component and the charged coupled device measures one or more characteristics associated with the reflected light. The characteristics are then used by a computing device to generate a measurement data file representative of the geometric profile of the cooling hole. A rotary table system can position the CMC component to present the cooling hole at different orientations.

20 Claims, 10 Drawing Sheets

SYSTEM AND METHOD FOR COLLECTING MEASUREMENT DATA OF SHAPED COOLING HOLES OF CMC COMPONENTS

FIELD

The subject matter of the present disclosure relates generally to metrology systems and methods of measuring certain features, and more particularly to systems and methods for measurement data collection and analysis of shaped cooling holes of ceramic matrix composite components of gas turbine engines.

BACKGROUND

Components of gas turbine engines are more commonly being made of ceramic matrix composite (CMC) materials due to their desirable material properties, particularly in the hot section of aviation gas turbine engines. For instance, turbine blades and nozzles, shrouds, and combustor liners are more commonly being formed of CMC materials. Some CMC components include cooling holes or other passages. Many times, such cooling holes and other passages have complex geometric shapes with demanding tolerances that require accurate and precise inspection information. Knowing the size, spacing, and distances of the cooling holes and other passages relative to one another and other features of the CMC component can ensure a CMC component is within specification, particularly in a production environment where both the speed and reliability of the measurements are of importance.

Traditional methods for measuring such features have proved unsatisfactory. For instance, the physical size of cooling holes of CMC components for gas turbine engines prevents traditional contact probes from being used as they are too large to effectively measure inside of the cooling hole. In addition, the hardness of the CMC material makes traditional ruby contact probes unsuitable for measurement as they wear over time due to the high hardness attributes of the CMC material. At least some traditional methods for measuring cooling holes and other features are non-contact methods. For instance, traditional shaped cooling hole inspection has utilized either X-Ray technology or Computed Tomography (CT) evaluation to collect material structure information inside of the part without the need for contact probes. Such methods have historically been performed on metal parts. One challenge with using such non-contact methods on CMC components is that one or more Environmental Barrier Coatings (EBC) are typically applied before cooling hole manufacturing, e.g., to prevent the coating from entering the holes. EBCs are disruptive to both X-Ray and CT technologies and either outright prevent measurement or significantly degrade accuracy of the measurement.

Accordingly, an improved measurement system for measuring cooling holes and other features of CMC components that addresses one or more of the challenges noted above would be useful. Moreover, a method for measuring such cooling features that addresses one or more of the challenges noted above would be beneficial.

BRIEF DESCRIPTION

Aspects and advantages of the invention will be set forth in part in the following description, or may be obvious from the description, or may be learned through practice of the invention.

In one aspect, a method for collecting measurement data for a cooling hole of a ceramic matrix composite (CMC) component is provided. The method includes adjusting at least one of the CMC component and a chromatic confocal sensor to present the cooling hole to the chromatic confocal sensor. The method also includes emitting, via the chromatic confocal sensor, stacked cones of light onto the CMC component. Further, the method includes sensing, via the chromatic confocal sensor, a geometric profile of a diffuser portion of the cooling hole based at least in part on one or more characteristics of light reflected off the CMC component. The method also includes adjusting at least one of the CMC component and the chromatic confocal sensor such that a centerline defined by the stacked cones of light emitted by the chromatic confocal sensor is off angle with respect to a centerline of the cooling hole. Further, the method includes sensing, via the chromatic confocal sensor, a geometric profile of a meter portion of the cooling hole as the centerline defined by the stacked cones of light emitted by the chromatic confocal sensor is off angle with respect to the centerline of the cooling hole. The method also includes generating, by one or more computing devices, a measurement data file based at least in part on the sensed geometric profile of the diffuser portion and the sensed geometric profile of the meter portion of the cooling hole.

In another aspect, a measurement system for collecting measurement data of a cooling feature defined by a component is provided. The measurement system includes a chromatic confocal sensor operable to emit stacked cones of light, the chromatic confocal sensor having a charged coupled device operable to measure one or more characteristics of light reflected by the component. Further, the measurement system includes a rotary table system operable to position the component such that the cooling feature is presented to the stacked cones of light emitted from the chromatic confocal sensor. The measurement system also includes a fixture mounted to the rotary table system and operable to retain the component. The measurement system further includes one or more computing devices communicatively coupled with the charged coupled device. The one or more computing devices are configured to: receive, from the charged coupled device of the chromatic confocal sensor, a signal indicative of the one or more characteristics of light reflected by the component; determine a plurality of measurement points based at least in part on the signal indicative of the one or more characteristics of the light reflected by the component; and generate a measurement data file representative of a geometric profile of at least a portion of the cooling feature based at least in part on the plurality of measurement points.

In yet another aspect, a method is provided. The method includes determining a centerline of a cooling hole defined by a component of a gas turbine engine. Further, the method includes adjusting a position of at least one of the component and a chromatic confocal sensor such that a lens of the chromatic confocal sensor is substantially perpendicular to the determined centerline of the cooling hole. The method also includes emitting, via the chromatic confocal sensor, stacked cones of light onto the component. The method also includes tilting at least one of the component and the chromatic confocal sensor in one or more directions such that in each direction the at least one of component and the chromatic confocal sensor is tilted the lens is off angle from perpendicular with respect to the centerline of the cooling hole to present an associated face of a sidewall of the cooling hole. Further, the method includes moving, for each of the one or more directions, the stacked cones of light emitted by the chromatic confocal sensor about the associated face to sense a geometric profile of the cooling hole. Further, the method includes generating a measurement data file based at least in part on the sensed geometric profile of the cooling hole.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 4:
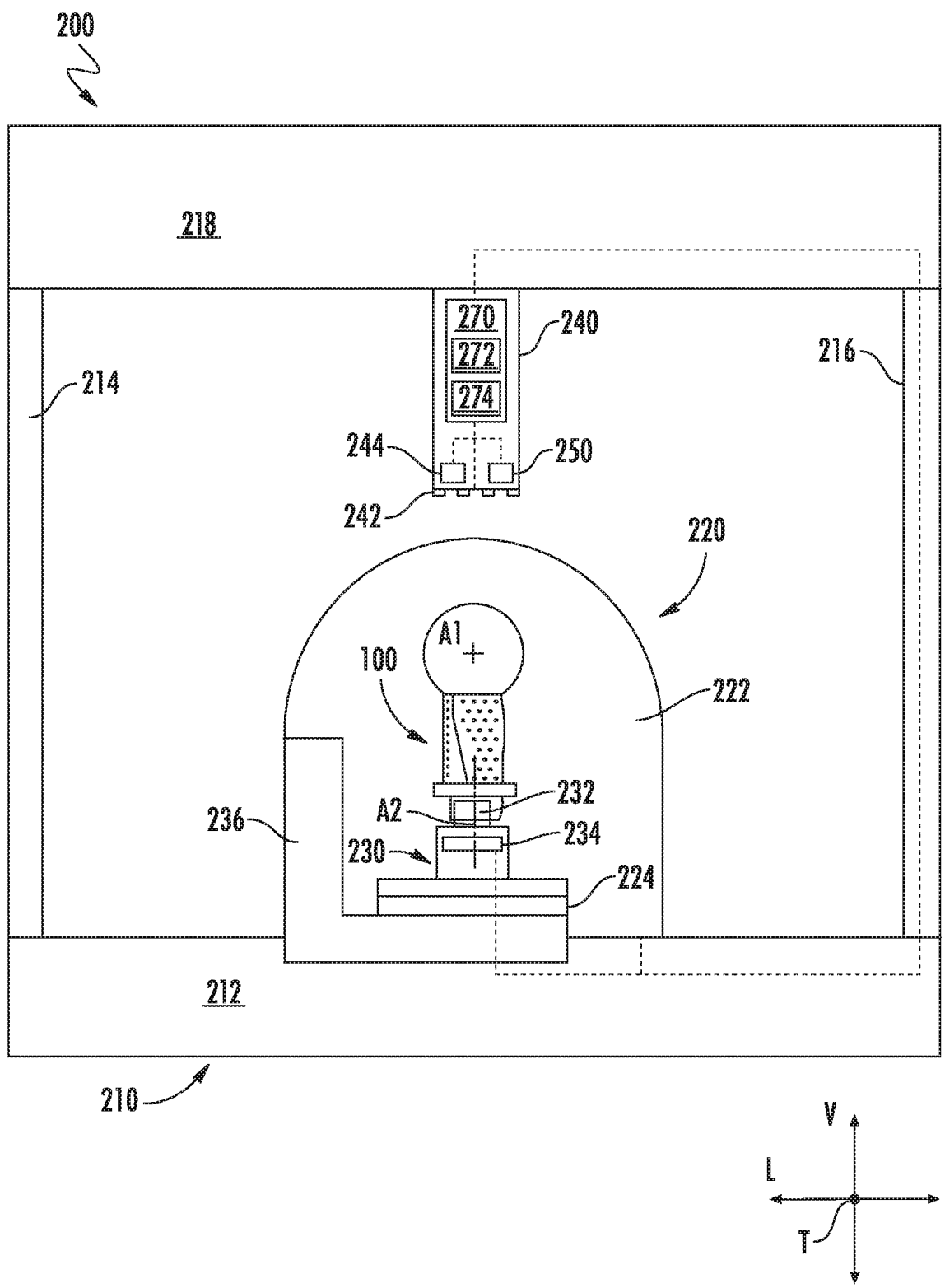
Figure 5:
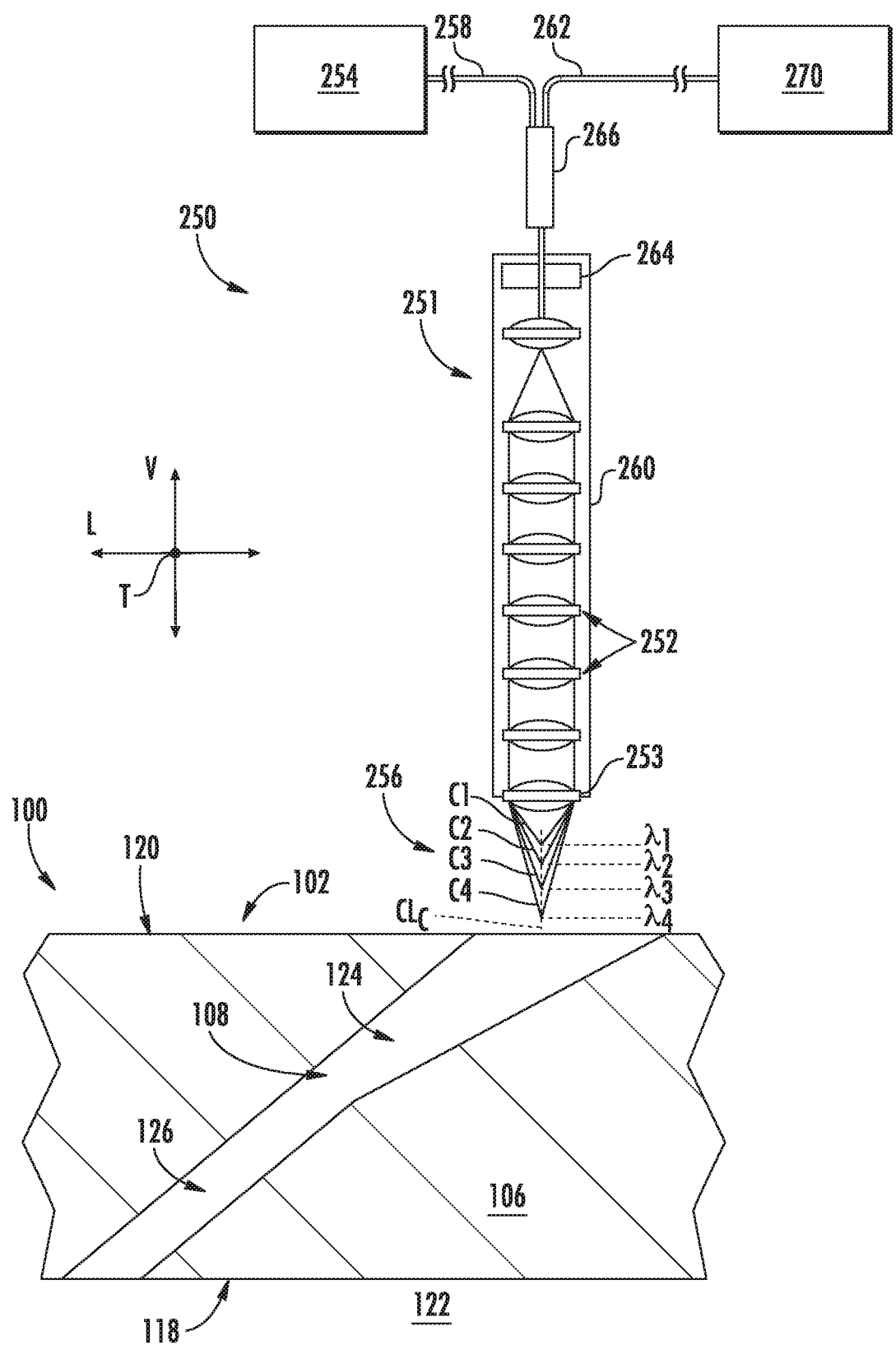
Figure 6:
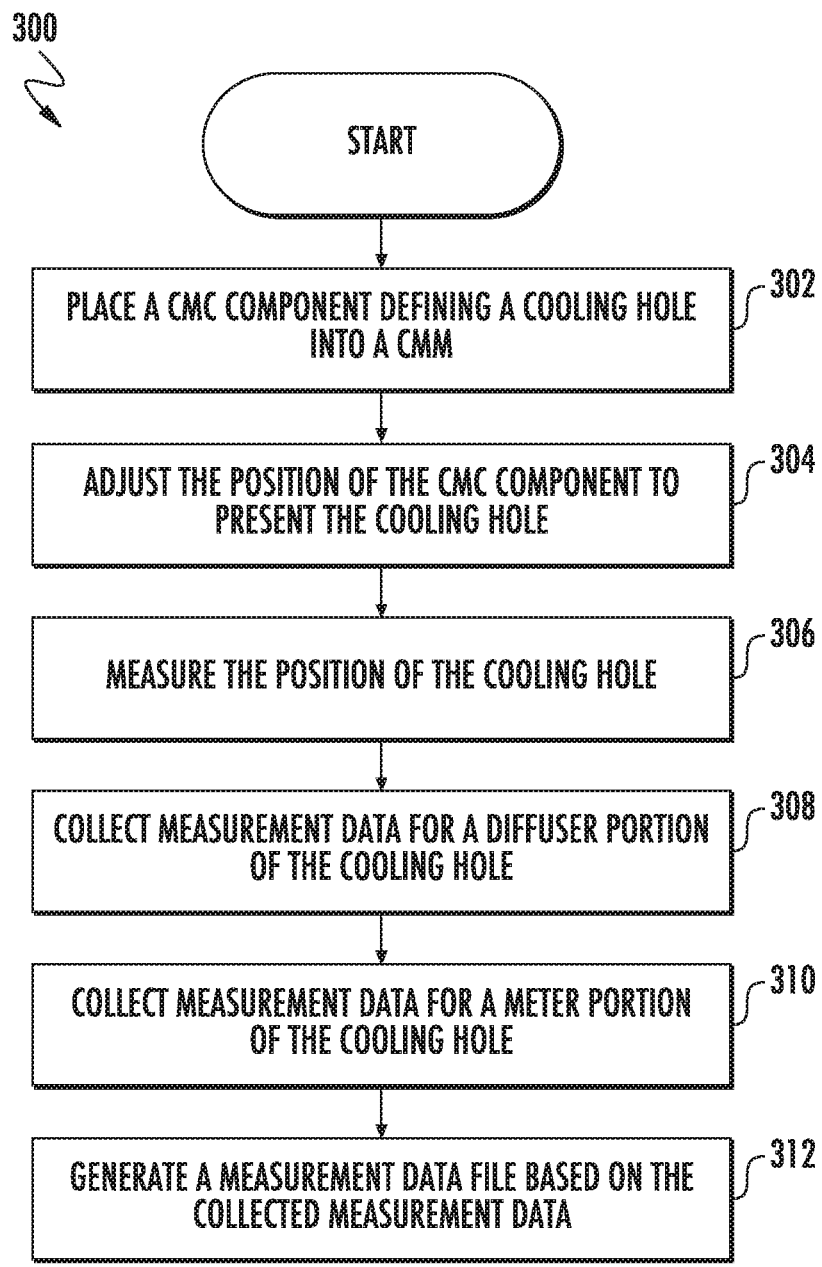
Figure 7:
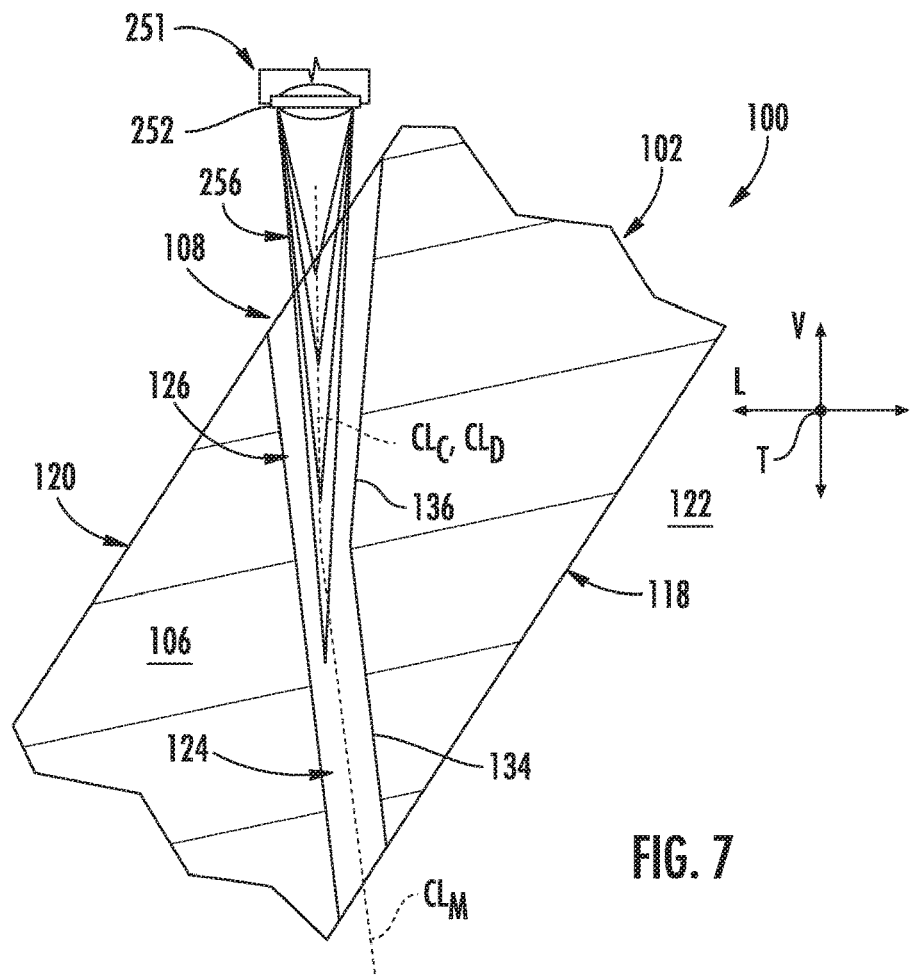
Figure 8:
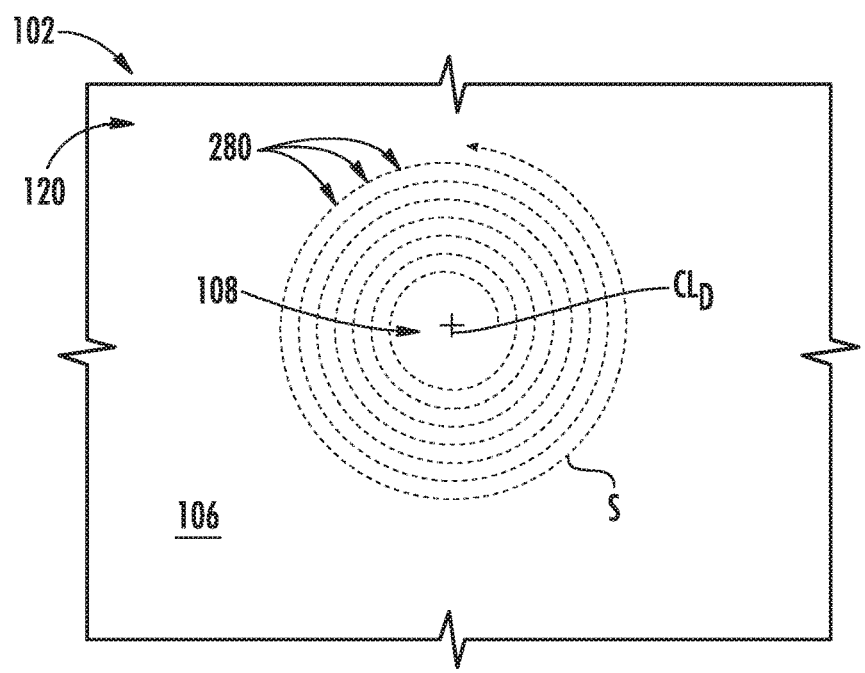
Figure 9:
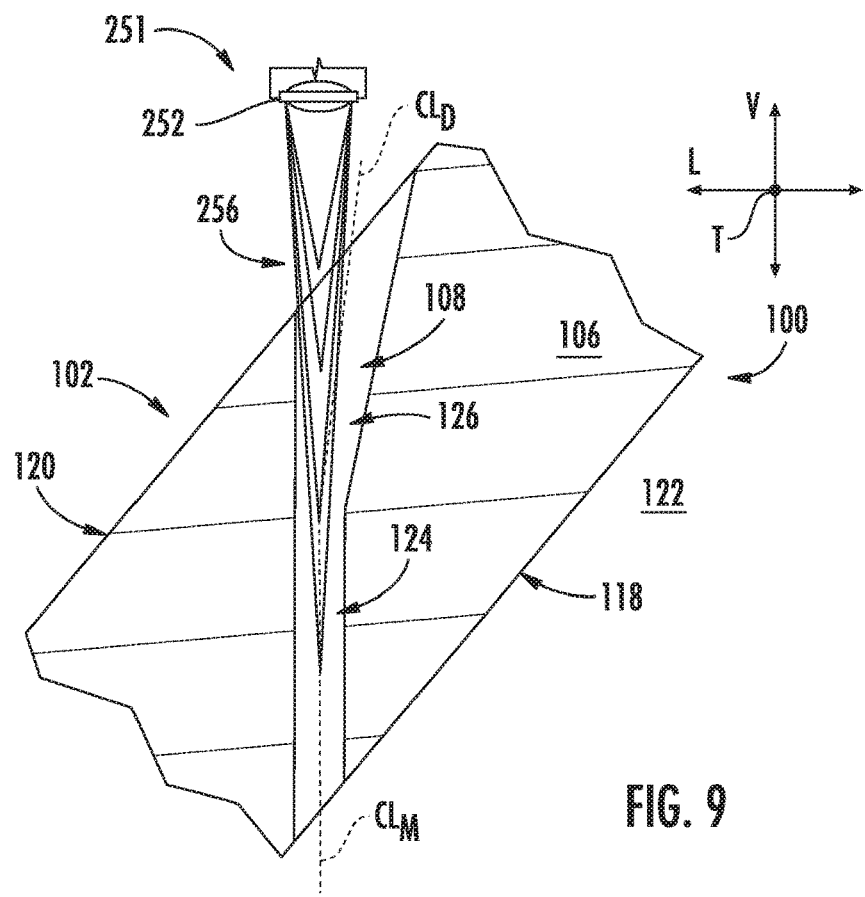
Figure 10:
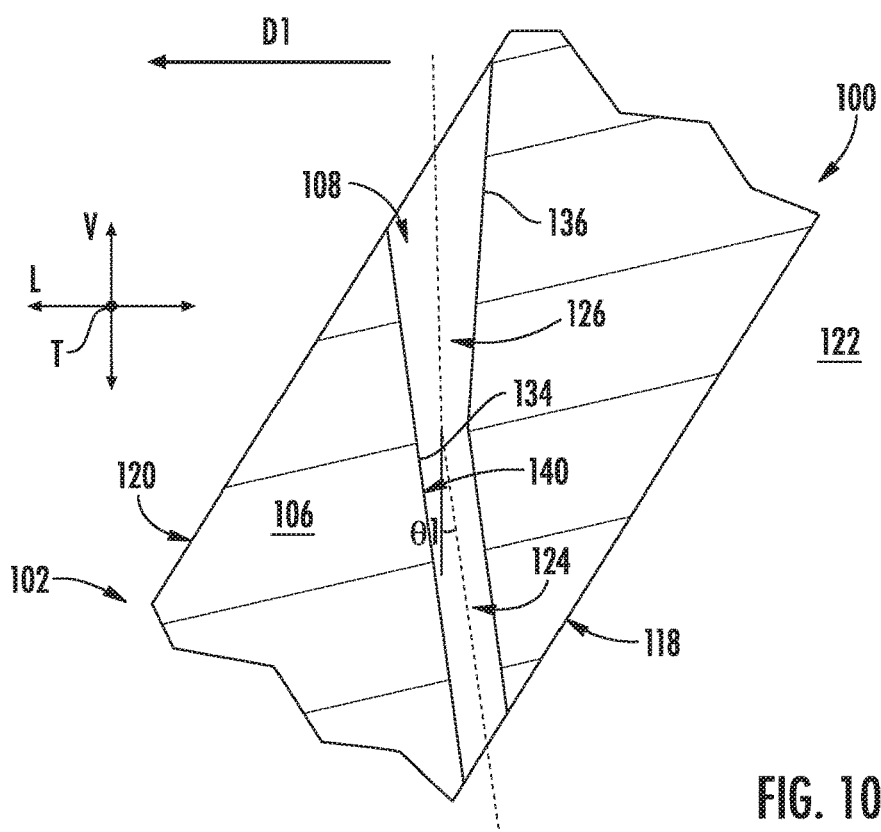
Figure 11:
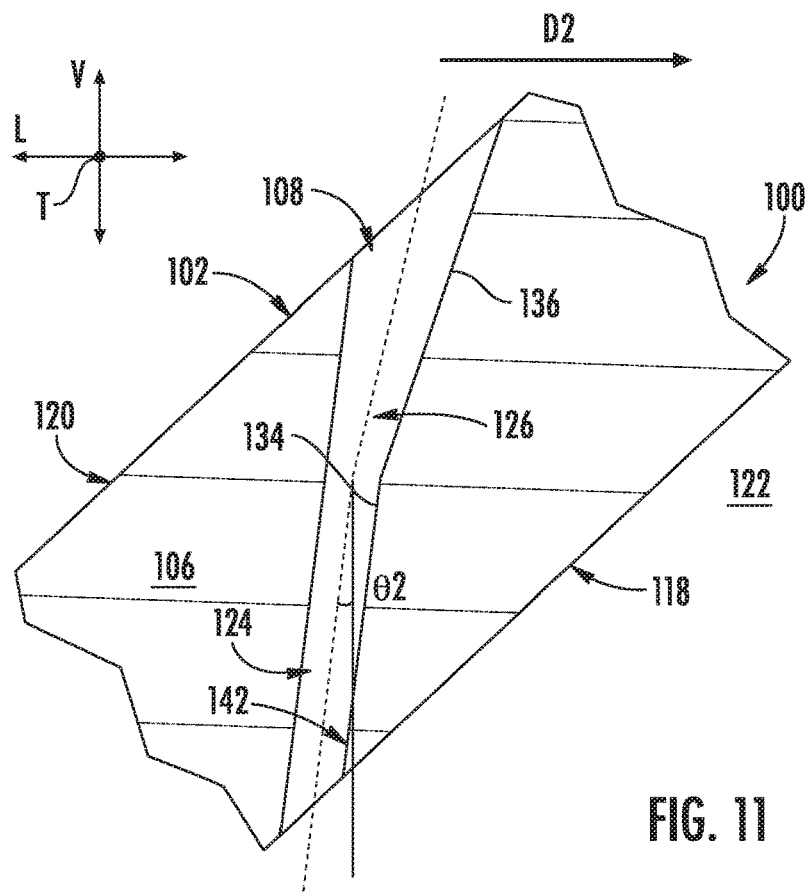
Figure 12:
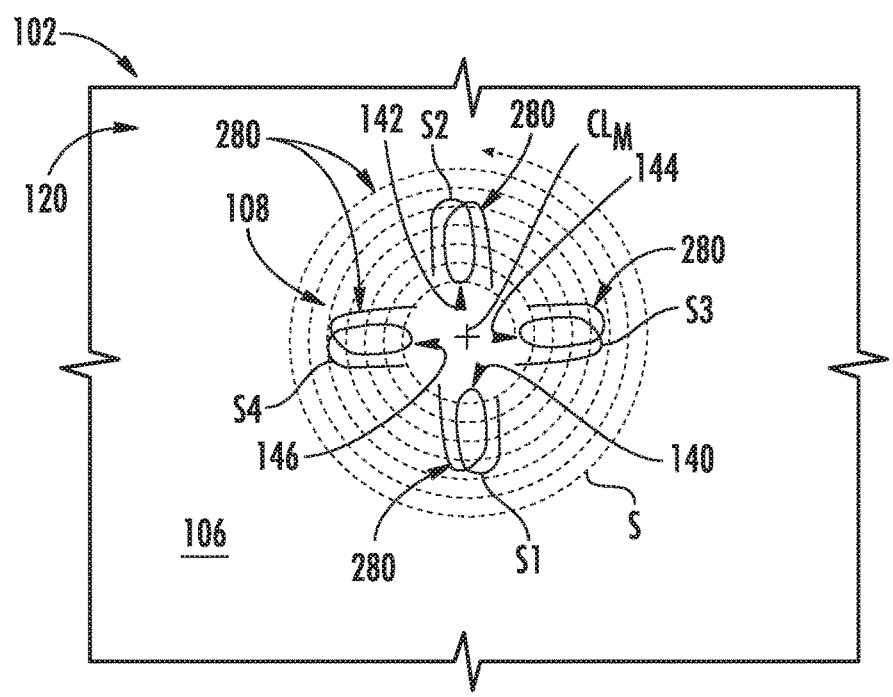
Figure 13:
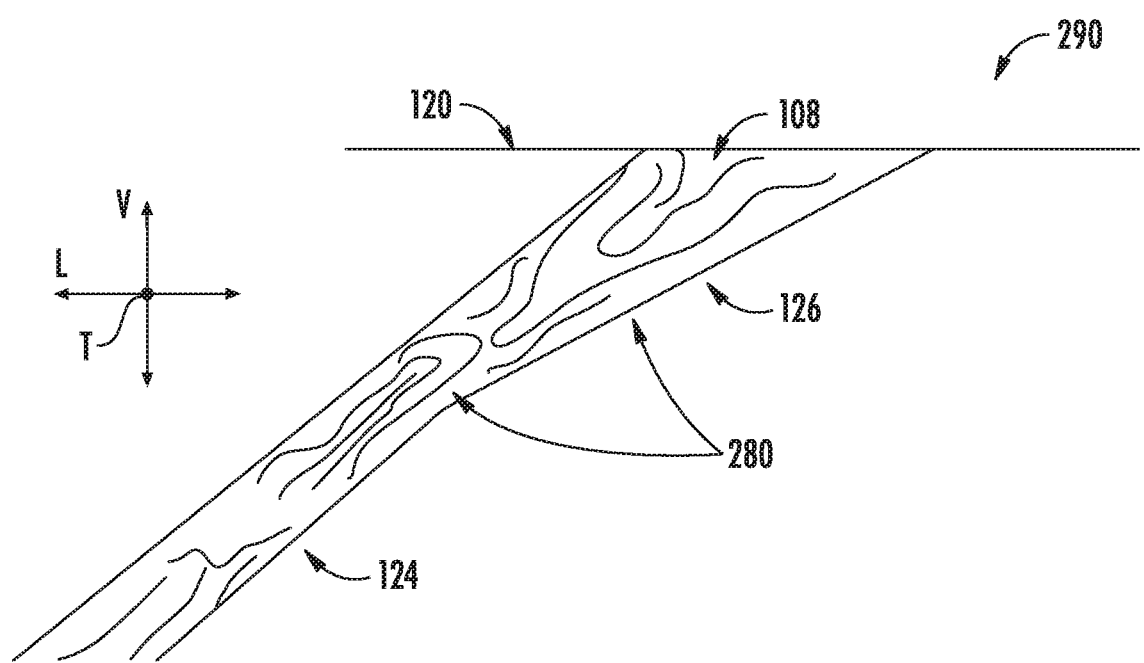
Figure 14:
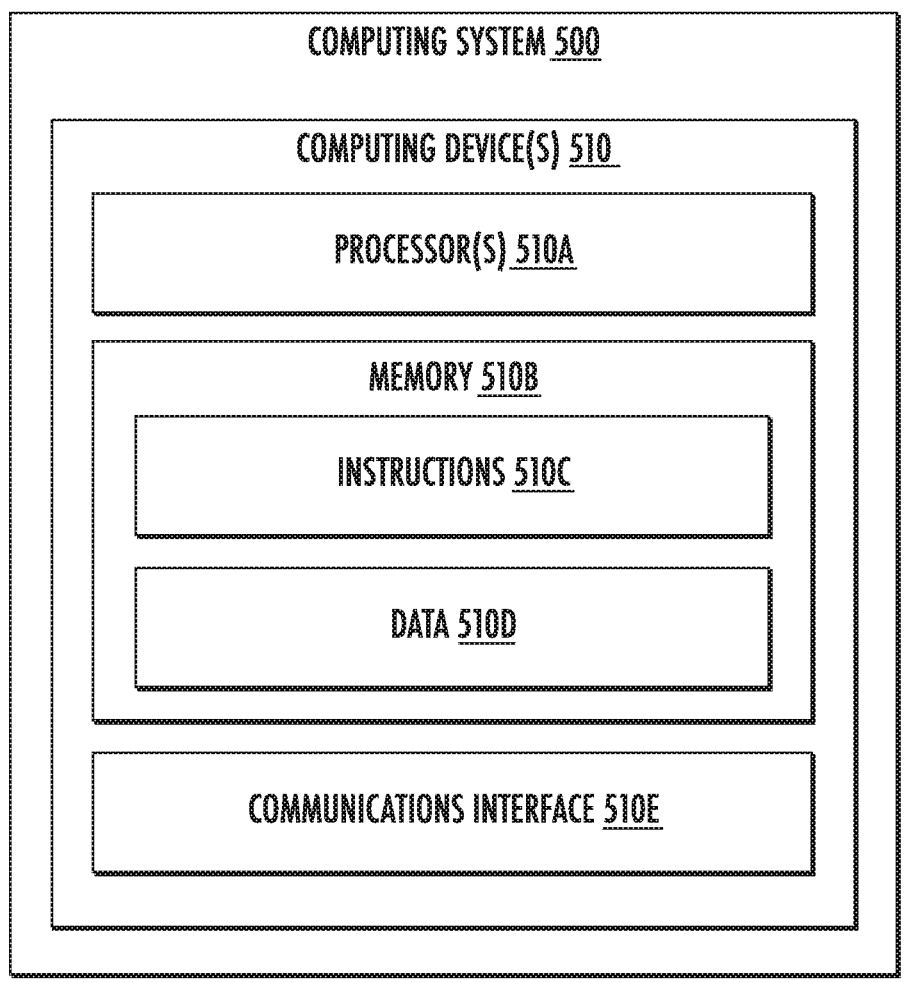

FIG. ° provides a schematic view of an example measurement system in accordance with an example embodiment of the present subject matter;

FIG. 5 provides an example non-contact measurement device of the measurement system of FIG. 4;

FIG. 6 provides a flow diagram of a method for collecting measurement data for a cooling hole of a CMC component in accordance with an example embodiment of the present subject matter;

FIG. 7 provides a close-up schematic view of a chromatic confocal sensor positioned to collect measurement data associated with a cooling hole of a CMC component in accordance with an example embodiment of the present subject matter;

FIG. 8 provides a top view of the cooling hole of FIG. 7 and depicts an example manner in which the chromatic confocal sensor can be moved about the cooling hole to collect measurement data in accordance with an example embodiment of the present subject matter;

FIG. 9 provides another close-up schematic view of the chromatic confocal sensor positioned to collect measurement data associated with the cooling hole of the CMC component in accordance with an example embodiment of the present subject matter;

FIG. 10 provides a schematic view of the CMC component adjusted in a first direction such that a first face of a sidewall of the cooling hole is presented to the lens of the chromatic confocal sensor in accordance with an example embodiment of the present subject matter;

FIG. 11 provides a schematic view of the CMC component adjusted in a second direction such that a second face of the sidewall of the cooling hole is presented to the lens of the chromatic confocal sensor in accordance with an example embodiment of the present subject matter;

FIG. 12 provides a top view of the cooling hole and depicts an example manner in which the chromatic confocal sensor can be moved such that the system can collect measurement points representative of the geometric profile of the meter portion of the cooling hole;

FIG. 13 provides a schematic view of an example measurement data file representative of at least a portion of a geometric profile of the cooling hole in accordance with an example embodiment of the present subject matter; and FIG. 14 provides an example computing system in accordance with an example embodiment of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. Furthermore, as used herein, terms of approximation, such as "approximately," "substantially," or "about," refer to being within a fifteen percent (15%) margin of error unless otherwise stated.

A measurement system and methods for collecting measurement data for certain features of ceramic matrix composite (CMC) components are provided. In one example aspect, the system and methods provided herein can be utilized to collect measurement data for a shaped cooling hole of a CMC component for an aviation gas turbine engine, such as a turbine blade, nozzle, or shroud. In one aspect, the measurement system includes a sensor system that provides high speed, accurate, and non-contact measurements for complex shape forms within cooling holes of CMC components. The sensor system includes a chromatic confocal sensor that has a charged coupled device. The chromatic confocal sensor is operable to emit stacked cones of light each having an associated wavelength. The stacked cones are moved over a target surface of the CMC component and the charged coupled device of the sensor measures one or more characteristics associated with the reflected light. The characteristics are then used by one or more computing devices to generate a measurement data file representative of the geometric profile of the cooling hole. For instance, the measurement data file can be a point cloud data file or a mesh data file.

In some embodiments, the system also includes a rotary table system that can rotate the CMC component to present a given cooling hole to the chromatic confocal sensor. To sense the geometric profile of an interior portion of the cooling hole (e.g., a meter portion), the rotary table system can adjust or tilt the CMC component to better present various faces of the sidewalls of the cooling hole and the chromatic confocal sensor can be moved about to capture the measurement points. In some other embodiments, the chromatic confocal sensor can be mounted to an indexing head that can be rotated and/or translated to sense a given cooling hole of the CMC component. In such embodiments, the system can but need not include a rotary table system.

Further, the system can include an optical camera and a fixture operatively coupled with the rotary table system. The fixture holds the CMC component in place and can include an internal lighting system operable to light an internal cavity of the CMC component. In this way, the cooling hole can be lit internally and the optical camera can thus more efficiently detect the cooling hole, measure cooling hole location variances or positional deviations with an expected position of the cooling hole, and/or automatically detect if the cooling hole is blocked or partially blocked.

With use of the sensor system provided herein, the geometric profile of various cooling holes can be sensed at angles from perpendicular from the target surface of the CMC component beyond what has conventionally been achieved. For instance, unexpectedly, the sensor system having the chromatic confocal sensor and the charged coupled device provided herein can collect measurement data on surfaces up to about eighty-seven degrees (87°) from perpendicular to the lens of the chromatic confocal sensor by taking advantage of the surface roughness and oxide layers formed on the sidewalls of the cooling hole during certain machining processes, such as electrical discharge machining and laser cutting processes. The dark color of the CMC component also facilitates reflection of light back to the chromatic confocal sensor at such angles. The relatively "rough" surface finish allows for sufficient light to reflect off the CMC component back to the sensor. The use of chromatic confocal sensors in collecting measurement data associated with cooling holes can enable high speed and accurate measurements of cooling holes, which is particularly useful in production environments. For example, with use of the system and methods described herein, measurement results (e.g., full point cloud data files) can be generated under about sixty (60) seconds and less than fifty (50) seconds on average for multiple holes of a CMC component.

Figure 1:
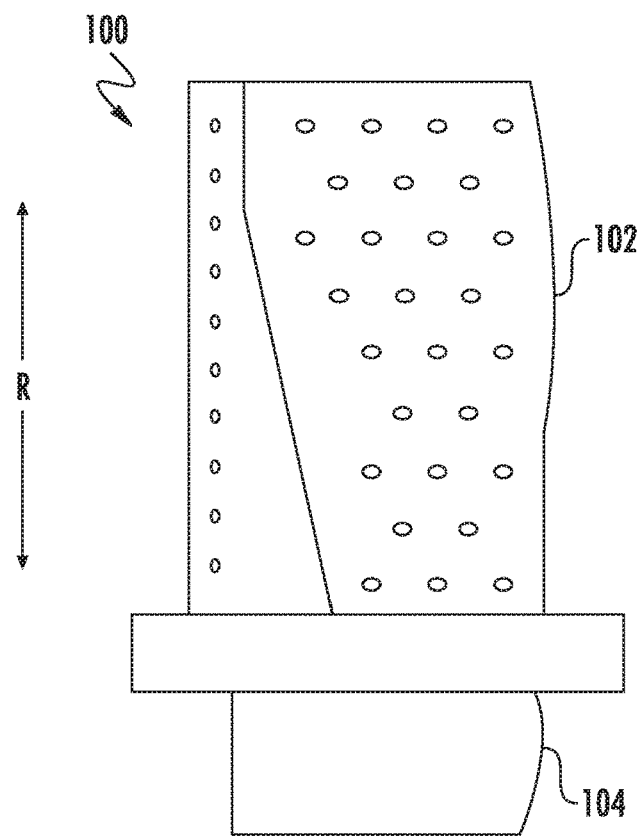
FIG. 1 provides a side elevation view of an example component of a gas turbine engine embodied as a rotor blade in accordance with an example embodiment of the present subject matter.
Figure 2:
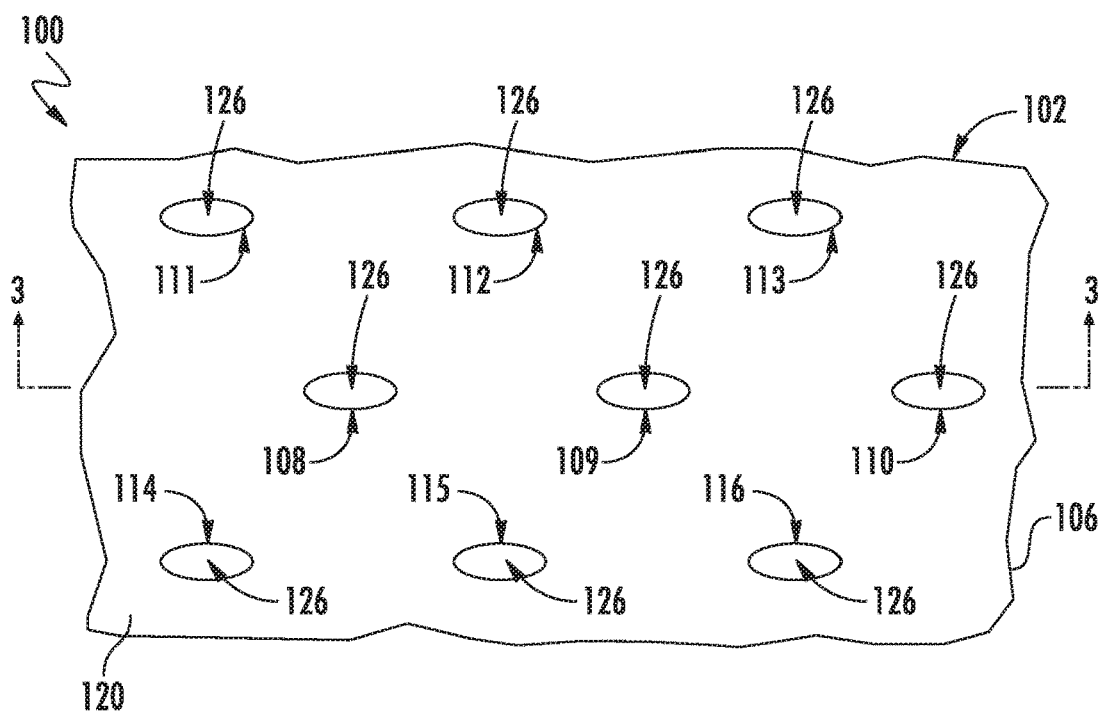
FIG. 2 provides a close-up view of a portion of the rotor blade of FIG. 1.
Figure 3:
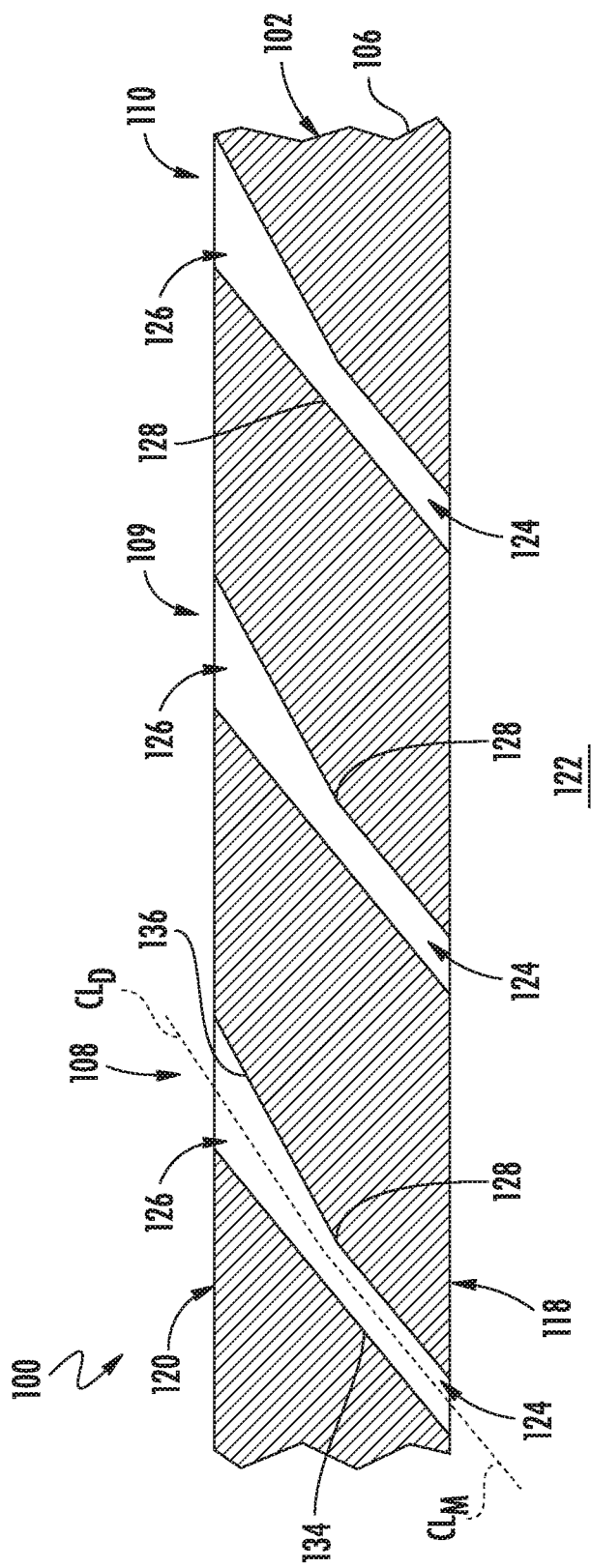
FIG. 3 provides a section view of the rotor blade taken along line 3-3 of FIG. 2.

FIGS. 1, 2, and 3 provide various views of an example turbine engine component embodied as a rotor blade 100 for an aviation gas turbine engine according to an example embodiment of the present subject matter. Particularly, FIG. 1 provides a side elevation view of the rotor blade 100. FIG. 2 provides a close-up view of a portion of the rotor blade 100. FIG. 3 provides a section view of the rotor blade 100 taken along line 3-3 of FIG. 2.

The rotor blade 100 includes an airfoil 102 that is connected to (e.g., formed integral with or attached to) a blade root 104. The airfoil defines a radial direction R. The airfoil 102 has an airfoil wall 106 that defines one or more cooling holes, including cooling holes 108-116. The cooling holes 108-116 can each have a diameter less than about 0.65 mm (0.025 inches), for example. Further, the airfoil wall 106 has an interior surface 118 and an exterior surface 120. The interior surface 118 defines at least a portion of an internal cavity 122 of the airfoil 102. The exterior surface 120 can at least partially define a leading edge, a trailing edge, a pressure side surface, and/or a suction side surface of the airfoil 102.

At least one of the cooling holes 108-116 extends through the airfoil wall 106 between its interior surface 118 and its exterior surface 120. For instance, as shown in FIG. 3, cooling holes 108, 109, 110 each extend through the airfoil wall 106 between the interior surface 118 and the exterior surface 120. Further, one or more of the cooling holes 108-116 can each include a shaped meter portion 124 and a diffuser portion 126, which is shaped the same or differently from the meter portion 124, and which is coupled in fluid communication with the meter portion 124 at a junction 128. For the illustrated embodiment of FIG. 3, the shaped meter portion 124 is depicted as a cylindrically-shaped bore. However, it should be understood that the meter portion 124 can have any suitable axisymmetric shape and not only a cylindrical shape. For example, the metered portion 124 can have a conical, elliptical, elliptical-conical, etc. shape. The shaped meter portion 124 extends into the airfoil wall 106 from the interior surface 118 to the diffuser portion 126. The diffuser portion 126 extends into the airfoil wall 106 from the exterior surface 120 to the meter portion 124. The meter portion 124 can have a substantially uniform (e.g., cylindrical) geometry and be sized to regulate a predetermined amount of fluid flow therethrough. In contrast, the diffuser portion 126 can have a tapered geometry (e.g., a tapered cylindrical geometry) that tapers as diffuser portion 126 extends from the exterior surface 120 towards the meter portion 124. The diffuser portion 126 is configured to condition the fluid flow such that the flow of fluid is maintained across the exterior surface 120, rather than being expelled into an ambient space away from the exterior surface 120. The meter portion 124 defines a centerline $CL_M$ and the diffuser portion 126 defines a centerline $CL_D$. The centerlines $CL_M$, $CL_D$ are at an angle with respect to each other in this example embodiment. However, in some embodiments, the centerlines $CL_M$, $CL_D$ can be collinear or coaxial with one another. Further, as depicted in FIG. 3, the shaped meter portion 124 is defined by a sidewall 134 and the diffuser portion 126 is defined by a sidewall 136.

Components of aviation gas turbine engines can be formed of composite components. For instance, the rotor blade 100 provided herein and other components positioned along a hot gas path of a gas turbine engine can be formed of a ceramic matrix composite (CMC) material, which is a non-metallic material having high temperature capability. Example CMC materials utilized for such composite components can include silicon carbide, silicon, silica, or alumina matrix materials and combinations thereof. Ceramic fibers can be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAIVIIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). CMC materials may have coefficients of thermal expansion in the range of about $1.3 \times 10^{-6}$ in/in/° F. to about $3.5 \times 10^{-6}$ in/in/° F. in a temperature range of approximately 1000-1200° F.

An exemplary fabrication process for such CMC components can include laying up one or more layers formed of "prepregs," or tape-like structures that include a reinforcement material (e.g., carbon fibers) impregnated with a slurry that contains a precursor of matrix material and one or more organic binders. The prepreg tapes undergo processing (including firing) to convert the precursor to the desired ceramic. Multiple plies of the resulting prepregs are then stacked and debulked to form a laminate preform.

Then, the preform component can undergo a compaction process, a burnout process, and a melt infiltrate process to cure the preform. More specifically, after the layup process, the preform component can be processed in an autoclave and subjected to elevated temperatures and pressures to produce a compacted, green state component. Various volatiles can be removed during compaction. Then, the green state component can be placed in a furnace to burn out excess binders or the like and then can be placed in a furnace with a piece or slab of silicon and fired to melt infiltrate the component with at least silicon. More particularly, heating (i.e., firing) the green state component in a vacuum or inert atmosphere decomposes the binders, removes the solvents, and converts the precursor to the desired pyrolyzed material. The decomposition of the binders results in a porous pyrolyzed body; the body may undergo densification, e.g., melt infiltration (MI), to fill the porosity. In one example, where the pyrolyzed component is fired with silicon, the component can undergo silicon melt-infiltration. However, densification can be performed using any known densification technique including, but not limited to, Silcomp, melt infiltration (MI), chemical vapor infiltration (CVI), polymer infiltration and pyrolysis (PIP), and oxide/oxide processes, and with any suitable materials including but not limited to silicon. In one embodiment, densification and firing may be conducted in a vacuum furnace or an inert atmosphere having an established atmosphere at temperatures above 1200° C. to allow silicon or other appropriate material or combination of materials to melt-infiltrate into the component.

Thereafter, the densified composite component can be finish machined as necessary. For instance, the component can be grinded or otherwise machined, e.g., to bring the component within tolerance and to shape the component to the desired shape. It will be appreciated that other methods or processes for forming composite components can be used as well.

FIG. 4 provides a schematic view of an automated, non-contact measurement system 200 for measuring one or more features of a component. For instance, the measurement system 200 can be utilized to measure or inspect one or more of the cooling holes 108-116 of the CMC rotor blade 100 depicted in FIGS. 1 through 3. Further, the measurement system 200 can be utilized to measure other components not formed of a CMC material, such as, without limitation, polymer matrix composite (PMC) components and metal components.

As shown in FIG. 4, the measurement system 200 includes a coordinate measurement machine 210 (CMM). The CMM 210 defines a vertical direction V, a lateral direction L, and a transverse direction T, which are mutually perpendicular to one another and define an orthogonal direction system. The CMM 210 includes a base 212, one or more support legs 214, 216, and a crosspiece 218 that collectively define a working area. The base 212 is spaced from the crosspiece 218 along the vertical direction V and the support legs 214, 216 are spaced from one another along the lateral direction L. The base 212 is connected with the crosspiece 218 via support legs 214, 216.

The CMM 210 includes a rotary table system 220 operable to position a component or workpiece such that select features can be presented to a non-contact measurement device of the measurement system 200. The rotary table system 220 can be mounted to the base 212, for example. As depicted, the rotary table system 220 includes a first rotary table 222 and a second rotary table 224 operatively coupled with the first rotary table 222. The second rotary table 224 can be connected to the first rotary table 222 by an L-bracket 236 or some other suitable structure. The first rotary table 222 is rotatable about a first axis of rotation A1, which extends in a direction parallel to the transverse direction T (or into and out of the page of FIG. 4). For this embodiment, the first rotary table 222 can be rotated about one hundred eighty degrees (180°) about the first axis of rotation A1. The second rotary table 224 is rotatable about a second axis of rotation A2. The second axis of rotation A2 is shown extending parallel with the vertical direction V in FIG. 4, but as will be appreciated, if the first rotary table 222 is rotated about the first axis of rotation A1, then the second axis of rotation A2 may not extend parallel with the vertical direction V. The second rotary table 224 can be rotated three hundred sixty degrees (360°) about the second axis of rotation A2. Generally, the first and second rotary tables 222, 224 can be rotated to position the component (e.g., the rotor blade 100) to present various features desired to be measured or inspected, such as cooling holes or other features. For this embodiment, the rotary table system 220 has five (5) degrees of freedom, and thus, the rotary table system 220 can position or move (e.g., rotate and/or translate) the component in five distinct directions.

A fixture 230 is mounted to the second rotary table 224 and is rotatable in unison with the second rotary table 224 about the second axis of rotation A2. The fixture 230 includes a workpiece holder 232 operable to secure and retain a workpiece or component in place during a measurement or inspection process. For instance, as shown in FIG. 4, the workpiece holder 232 can retain the rotor blade 100. The workpiece holder 232 can be any suitable device for retaining the workpiece in place for inspection/measurement. The workpiece holder 232 can be a chuck, a chuck jaw, or some other suitable device. As further depicted in FIG. 4, the fixture 230 includes a fixture lighting system, including one or more fixture light sources 234 positioned within or mounted to the fixture 230. The light source(s) 234 can be illuminated to create internal lighting within the inner cavity of the workpiece. For instance, the light source(s) 234 can be illuminated to light the internal cavity 122 (FIG. 3) of the rotor blade 100. This can, for example, create a silhouette of the airfoil surface that is presented to a camera and negates the influence of any surface irregularities on the workpiece.

The CMM 210 also includes a ram 240. The ram 240 is mounted to the crosspiece 218 and is movable along the vertical direction V (e.g., up and down), and for this embodiment, the lateral direction L and/or transverse direction T. The ram 240 can also be moved in circular or spiral motion. The ram 240 can include one or more light sources 242, e.g., for illuminating the retained component. Moreover, for this embodiment, the ram 240 includes an optical camera 244. The optical camera 244 is operable to capture one or more images, e.g., of various cooling features of the component, such as the cooling holes 108-116 (FIG. 2) of the rotor blade 100. Based on the one or more captured images, a positional deviation of a given feature from its expected position can be determined, e.g., by one or more computing device(s) 270 communicatively coupled with the optical camera 244. In this manner, as will be explained herein, the geometric profile of cooling features can be sensed based at least in part on the determined positional deviation or offset. The optical camera 244 can also be utilized for automated blocked hole detection for the cooling holes. Further, the ram 240 also houses a sensor system 250. As will be explained below, the sensor system 250 can include a non-contact measurement device, such as a chromatic confocal sensor.

FIG. 5 provides a close-up view of the sensor system 250 of the measurement system 200 of FIG. 4. As shown, the sensor system 250 includes a chromatic confocal sensor 251. The chromatic confocal sensor 251 includes one or more lenses 252, including an objective lens 253, operable to focus light emitted from a white light source 254 such that the one or more lenses 252 emit light in stacked concentric cones 256. Particularly, the white light source 254 can be in communication with the stack of lenses 252 via a fiber optic cable 258, or in alternative embodiments, the white light source 254 can be positioned within a housing 260 of the chromatic confocal sensor 251. The white light source 254 can be an LED light source or any other suitable white light source. Light can be passed from the white light source 254 through the fiber optic cable 258 to the lenses 252 of the chromatic confocal sensor 251. The lenses 252 break apart the individual wavelengths of the incoming light using chromatic aberration. The light is then refocused in the stacked concentric cones 256, which vary in their focal point distance based on the frequency/color of the light being emitted. For instance, as depicted in FIG. 5, the focal point of a first cone C1 can correspond with a wavelength $\lambda_1$, the focal point of a second cone C2 can correspond with a wavelength $\lambda_2$, the focal point of a third cone C3 can correspond with a wavelength $\lambda_3$, and the focal point of a fourth cone C4 can correspond with a wavelength $\lambda_4$. The stacked cones 256 can define a centerline $CL_C$. In some embodiments, the emitted cones can be about ten degree cones (10°), about nine degree cones (9°), or about eight degree cones (8°). In some embodiments, the emitted cones can be about eight degree cones to about forty-five degree cones (8°-45°).

The stacked cones 256 can be passed over the target surface (e.g., along the exterior surface 120 of the rotor blade 100 and along the sidewalls 134, 136 (FIG. 3) of the cooling hole 108). The cone having its apex at the distance of the target surface will then reflect the highest intensity of light back into the lenses 252 of the chromatic confocal sensor 251. As depicted in FIG. 5, the chromatic confocal sensor 251 includes a charged coupled device sensor 264 (CCD). The CCD 264 measures one or more characteristics of the light reflected by the component. The one or more characteristics of the light reflected by the component can include the frequency and intensity of the reflected light, for example. One or more signals indicative of the measured one or more characteristics of the reflected light are then routed via a fiber optic cable 262 and through a fiber coupler 266 to a processing device (e.g., of the one or more computing devices 270). The processing device can interpret the incoming signal indicative of the frequency and intensity of the returned light and can correspond or associate a distance to the target measurement surface by utilizing a predefined frequency-to-distance relationship. The relationship between the frequency of the returned light and the corresponding distance to the target can be established through the initial calibration of the lenses 252, for example.

Returning to FIG. 4, the measurement system 200 also includes one or more computing device(s) 270. In FIG. 4, the one or more computing device(s) 270 are represented by a single computing device; however, it will be appreciated that the one or more computing device(s) 270 can include a plurality of computing devices. The one or more computing device(s) 270 can include one or more processing devices 272 and one or more memory devices 274. The one or more memory devices 274 can store computer-readable instructions that can be executed by the one or more processing devices 272 to perform operations. The one or more computing devices 270 can be configured in substantially the same manner as one of the computing devices of the exemplary computing system 500 described below with reference to FIG. 14 and can be configured to perform one or more of the operations described herein, such as some or all of the operations of the method (300) described herein.

The one or more computing device(s) 270 are communicatively coupled with various components of the measurement system 200. For instance, as shown in FIG. 4, the one or more computing device(s) 270 are communicatively coupled with the ram 240 and its components housed therein, including the one or more light sources 242, the optical camera 244, and the sensor system 250, including the chromatic confocal sensor 251 and the CCD 264 thereof. Further, the one or more computing device(s) 270 are communicatively coupled with the rotary table system 220, including the first rotary table 222 and the second rotary table 224. In this way, the one or more computing device(s) 270 can control or cause movement of the first and second rotary tables 222, 224, e.g., to present one or more features of the workpiece to the chromatic confocal sensor 251 and/or optical camera 244. In addition, the one or more computing device(s) 270 are communicatively coupled with the fixture 230, including the fixture light source 234. The one or more computing device(s) 270 can be communicatively coupled with the various components of the measurement system 200 via any suitable wired and/or wireless communication links.

As illustrated in FIG. 4, the one or more computing device(s) 270 can be housed within or mounted to the ram 240. In other embodiments, the one or more computing device(s) 270 can be housed within or mounted to the crosspiece 218, the base 212, within one of the support legs 214, 216, or some other location. Notably, in some embodiments, the fiber optic cable 262 communicatively coupling the CCD 264 and the one or more computing device(s) 270 is less than about three meters (3 m). In this way, reflected noise within the fiber optic cable 262 can be reduced. This can be achieved, at least in part, by mounting the one or more computing device(s) 270 to the ram 240. In yet other embodiments, the fiber optic cable 262 communicatively coupling the CCD 264 and the one or more computing device(s) 270 is less than about one meter (1 m).

FIG. 6 provides a flow diagram of a method (300) in which the measurement system 200 can inspect/measure a feature of a component (e.g., a cooling hole 108-116 of the CMC rotor blade 100). Particularly, FIG. 6 provides a flow diagram of a method for collecting measurement data for a cooling hole of a CMC component. Reference will also be made below to FIGS. 1 through 5 to provide context to method (300). Although described in the context of measuring/inspecting a cooling feature of a CMC component, it will be appreciated that method (300) can be applied to components formed of other materials, such as PMC materials and metal materials. In addition, it will be appreciated that method (300) can be modified, adapted, expanded, rearranged and/or omitted in various ways without deviating from the scope of the present subject matter.

At (302), the method (300) includes placing a CMC component defining a cooling hole into a CMM of a measurement system. For instance, the CMC component can be the rotor blade 100 of FIG. 1. The CMM can be the CMM 210 of FIG. 4. By way of example, the rotor blade 100 can be placed into and secured by the workpiece holder 232 of the fixture 230, e.g., as shown in FIG. 4.

At (304), the method (300) includes adjusting the position of at least one of the CMC component and the chromatic confocal sensor to present the cooling hole. For instance, the CMC component can be adjusted by a rotary table system, such as the rotary table system 220 of the CMM 210. In such embodiments, once the rotor blade 100 is retained by the workpiece holder 232, the one or more computing devices 270 can cause the rotary table system 220 to position the CMC rotor blade 100 such that the cooling hole (e.g., cooling hole 108) is presented to the ram 240, or more particularly, to the optical camera 244 and/or chromatic conical sensor 251 of the ram 240. The one or more computing devices 270 can cause the first rotary table 222 to rotate about the first axis of rotation A1 and/or the second rotary table 224 to rotate about the second axis of rotation A2 such that the cooling hole 108 is presented for inspection and/or measurement. Additionally or alternatively, in some embodiments, the chromatic confocal sensor can be adjusted by an indexing head or the like to which the chromatic confocal sensor is mounted. The indexing head is operable to position the chromatic confocal sensor such that cooling hole is presented to the chromatic confocal sensor.

At (306), the method (300) includes determining a position of the cooling hole. In this way, the position of the cooling hole can be determined, a variance in the location of the hole relative to design specification can be determined, and/or blocked or partially blocked holes can be detected.

In some implementations, the cooling hole can be internally lit to facilitate determining the position and center of the cooling hole. For instance, in some implementations, the method (300) includes lighting, via one or more fixture light sources of the fixture, an internal cavity defined by the CMC component such that the cooling hole is lit internally. For example, the one or more computing devices 270 can cause the fixture light source 234 of the fixture 230 to illuminate. When the fixture light source 234 is illuminated, the internal cavity 122 of the rotor blade 100 becomes illuminated or lit up. Illuminating the cooling hole 108 internally or from within assists the optical camera 244 with locating the cooling hole 108, detecting if the cooling hole 108 is blocked or partially blocked, and with determining whether the cooling hole 108 is offset from its expected position. That is, by illuminating the internal cavity 122, the optical camera 244 can more precisely capture the cooling hole position and can detect the presence of any blocked or partially blocked holes automatically. Furthermore, in such implementations, the method (300) also includes capturing, via an optical camera, one or more images of the cooling hole. For instance, the optical camera 244 can capture one or more images of the CMC component. Data indicative of the one or more captured images can be routed to the one or more computing devices 270 for analysis.

In addition, in some implementations, the method (300) includes determining, via the one or more computing devices communicatively coupled with the optical camera, a positional deviation of the cooling hole with respect to an expected position of the cooling hole based at least in part on the one or more captured images. Further, in some implementations, the method (300) also includes determining, via the one or more computing devices, the centerline of the cooling hole based at least in part on the one or more captured images. Moreover, in some implementations, the method (300) also includes determining, via the one or more computing devices, whether the cooling hole is blocked or partially blocked based at least in part on the one or more captured images. Accordingly, based on the one or more captured images, the one or more computing devices 270 can determine the position of the cooling hole 108, the center or centerline of the cooling hole, and/or whether the cooling hole is fully or partially blocked, e.g., by an EBC coating.

At (308), the method (300) includes collecting measurement data for a diffuser portion of the cooling hole. The diffuser portion can be an external portion or end of the cooling hole and can be shaped to a desired specification to facilitate cooling of the component, e.g., during operation of a gas turbine engine in which the component is disposed. Measurement data for the exterior surface immediately surrounding the cooling hole can also be collected.

In some implementations, collecting measurement data for the diffuser portion of the cooling hole includes adjusting the CMC component to present the cooling hole to a chromatic confocal sensor. For instance, the one or more computing devices 270 can cause the rotary table system 220 (e.g., the first rotary table 222 and the second rotary table 224) to adjust the position of the CMC component such that the centerline $CL_C$ of the stacked cones 256 is parallel or substantially parallel with the centerline of the cooling hole, which can be the diffuser centerline $CL_D$ or the meter centerline $CL_M$. In some implementations, the one or more computing devices 270 can cause the rotary table system 220 to adjust the position of the CMC component such that the centerline $CL_C$ of the stacked cones 256 is coaxial with the centerline of the cooling hole 108, which can be the diffuser centerline $CL_D$ or the meter centerline $CL_M$ as noted above. In alternative embodiments, the one or more computing devices 270 can cause an indexing head or ram to which the chromatic confocal sensor is mounted to adjust the position of the chromatic confocal sensor 251 such that the centerline $CL_C$ of the emitted stacked cones 256 is parallel or substantially parallel with the centerline of the cooling hole, which can be the diffuser centerline $CL_D$ or the meter centerline $CL_M$.

By way of example, FIG. 7 provides a close-up schematic view of the chromatic confocal sensor 251 positioned such that the centerline $CL_C$ of the stacked cones 256 of light emitted from the chromatic confocal sensor 251 is coaxial with the centerline of the cooling hole 108, which is the diffuser centerline $CL_D$ in this example. As noted above, the rotary table system 220 can position the CMC rotor blade 100 such that the chromatic confocal sensor 251 is coaxial with the meter centerline $CL_M$ of the cooling hole 108.

After positioning the CMC component in position to present the cooling hole 108 to the chromatic confocal sensor 251, the method (300) also includes emitting, by the chromatic confocal sensor, stacked cones of light each having an associated predefined wavelength. For instance, the one or more computing devices 270 (FIG. 4) can cause or trigger the chromatic confocal sensor 251 to emit the stacked concentric cones 256 of light. Particularly, the one or more computing devices 270 can cause the white light source 254 (FIG. 5) to emit white light. The emitted white light can be passed from the white light source 254 through the fiber optic cable 258 (FIG. 5) to the series of lenses 252 of the chromatic confocal sensor 251. The lenses 252 break apart the individual wavelengths of the incoming light using chromatic aberration, and as a result, the chromatic confocal sensor 251 emits stacked cones 256 of light each having predefined associated wavelengths. The ram 240 (FIG. 4) can move the chromatic confocal sensor 251 proximate the cooling hole 108, e.g., as shown in FIG. 7, such that the emitted stacked cones 256 can directly interact with the surfaces defining the cooling hole 108 as the chromatic confocal sensor 251 is moved about the cooling hole 108.

In collecting measurement data for the diffuser portion 126 and the exterior surface 120 of the CMC component, the method (300) includes sensing, via the chromatic confocal sensor, a geometric profile of the diffuser portion of the cooling hole. In this way, a plurality of measurement points can be collected that are representative of a geometric profile of the diffuser portion of the cooling hole and the surrounding exterior surface. For instance, in some implementations, sensing, via the chromatic confocal sensor, the geometric profile of the diffuser portion of the cooling hole includes sensing, via the chromatic confocal sensor, the geometric profile of the diffuser portion of the cooling hole as the chromatic confocal sensor is moved (e.g., in a spiral motion) about the centerline of the cooling hole.

By way of example, FIG. 8 provides a top view of the cooling hole 108 of FIG. 7 and depicts an example manner in which the chromatic confocal sensor 251 can be moved in a spiral motion (e.g., by ram 240 (FIG. 4)) about the centerline of the cooling hole 108. After the rotary table system 220 (FIG. 4) positions the CMC rotor blade 100 to present the cooling hole 108 such that the centerline (e.g., the centerline $CL_D$) of the cooling hole 108 is coaxial with the centerline $CL_C$ of the stacked concentric cones 256 emitted from the chromatic confocal sensor 251, the chromatic confocal sensor 251 can be moved in a spiral movement, denoted by the spiraling arrow S. The chromatic confocal sensor 251 can be moved about the centerline $CL_D$ of the cooling hole 108 in a spiral motion S to collect measurement points 280 representative of a geometric profile of the diffuser portion 126 of the cooling hole 108 and the surrounding exterior surface 120. That is, the chromatic confocal sensor 251 can be moved three hundred sixty degrees (360°) about the centerline $CL_D$ in the spiral motion S. As depicted in FIG. 8, the spiral motion S can grow gradually radially outward from the centerline $CL_D$. Moving the chromatic confocal sensor 251 in a spiral motion S allows the chromatic confocal sensor 251 and CCD 264 to capture reflected light and ultimately to collect measurement points 280 in a continuous, predefined manner. Thus, the process is efficient and repeatable. In other example embodiments, the chromatic confocal sensor 251 can be moved in other suitable continuous motions or patterns, such as in a continuous serpentine motion.

To generate the measurement points 280, the chromatic confocal sensor 251 is moved about the cooling hole 108 (e.g., in the spiral motion S) such that the emitted stacked cones 256 directly interact with the surfaces defining the diffuser portion 126 of the cooling hole 108 as well as the surrounding exterior surface 120. At a particular measurement point 280, the cone having its apex at the distance of the target surface reflects the highest intensity of light back into the chromatic confocal sensor 251 and the CCD 264 (FIG. 5) measures one or more characteristics of the reflected light (e.g., the frequency and intensity of the light associated with the cone having its apex at the target surface. The one or more computing devices 270 (FIG. 4) can then determine, based at least in part on the measured frequency and intensity of the light, the distance between the chromatic confocal sensor 251 and the target surface. The distance along with other distance measurements can be applied to the positional scales of the CMM 210 (FIG. 4) to create the 3D measurement points 280. Particularly, the measurement points 280 can be collected in rapid succession at rates between 100 Hz and 1000 Hz while the chromatic confocal sensor 251 moves in a predefined pattern over the cooling hole 108 (e.g., a spiral motion S). The measurement points 280 are collected or stored in a memory device 274 (FIG. 4) of the one or more computing devices 270 and a measurement data file can be generated (e.g., by the one or more computing devices 270), which can be used for analysis of the geometry of the CMC component.

Notably, the chromatic confocal sensor 251 of the sensor system 250 (FIG. 5) can collect measurement points 280 on surfaces up to about eighty-seven degrees (87°) from perpendicular to the lens 252 of the chromatic confocal sensor 251. Stated another way, the sensor system 250 (FIG. 5) can collect measurement points 280 on surfaces up to about eighty-seven degrees (87°) from perpendicular with respect to the centerline $CL_C$ of the emitted stacked concentric cones 256. In accordance with inventive aspects of the present disclosure, this unexpected result can be achieved by taking advantage of small surface roughness irregularities that are produced during machining of the cooling hole 108, such as by electrical discharge machining (EDM) and laser manufacturing processes. The relatively "rough" surface finish of the sidewalls of the cooling hole 108 allow for ample return light reflections from the target surface (e.g., sidewall 136) within the cooling hole 108 to the chromatic confocal sensor 251, which can ultimately be captured by the CCD 264 of the sensor so that one or more characteristics of the reflected light can be determined, e.g., the intensity and frequency of the reflected light. Additionally, silicon dioxide layers produced from laser manufacturing processes can coat the inside of the cooling hole 108, which further reduces the reflectivity of any smooth areas that may be present within the cooling hole 108; thus, silicon dioxide layers also assist in reflecting light back to the lens 252 of the chromatic confocal sensor 251 and ultimately to the CCD 264.

At (310), the method (300) includes collecting measurement data for a meter portion of the cooling hole. The meter portion of the cooling hole can be an internal portion or end of the cooling hole and can be a cylindrically shaped through hole, for example.

In some implementations, collecting measurement data for the meter portion of the cooling hole includes adjusting at least one of the CMC component and the chromatic confocal sensor to present the cooling hole to the chromatic confocal sensor. For instance, the one or more computing devices 270 can cause the rotary table system 220 (e.g., the first rotary table 222 and the second rotary table 224) to adjust the position of the CMC component such that the centerline $CL_C$ of the stacked cones 256 is parallel or substantially parallel with the centerline of the cooling hole, which can be the diffuser centerline $CL_D$ or the meter centerline $CL_M$. In some implementations, the one or more computing device 270 can cause the rotary table system 220 to adjust the position of the CMC component such that the centerline $CL_C$ of the stacked cones 256 is coaxial with the centerline of the cooling hole 108, which can be the meter centerline $CL_M$. By way of example, FIG. 9 provides a close-up schematic view of the CMC component positioned such that the centerline $CL_C$ of the stacked cones 256 of light emitted from the chromatic confocal sensor 251 is coaxial with the meter centerline $CL_M$ of the cooling hole 108. As noted above, in some alternative embodiments, the chromatic confocal sensor 251 can be adjusted (e.g., by an indexing head) to present the cooling hole to the chromatic confocal sensor.

After positioning the CMC component in position such that the centerline $CL_C$ of the stacked cones 256 of light emitted from the chromatic confocal sensor 251 is coaxial with the meter centerline $CL_M$ of the cooling hole 108, the method (300) includes adjusting, via the rotary table system 220, the CMC component such that the centerline $CL_C$ of the stacked cones 256 of light emitted from the chromatic confocal sensor 251 is off angle with respect to the meter centerline $CL_M$ of the cooling hole 108. Then, as the centerline $CL_C$ of the stacked cones 256 of light is off angle with respect to the meter centerline $CL_M$ of the cooling hole 108, the method (300) also includes sensing a geometric profile of the meter portion 126 of the cooling hole 108. As will be explained below, the rotary table system 220 can adjust or tilt the CMC component in a plurality of directions to move the centerline $CL_C$ of the stacked cones 256 of light off angle with respect to the meter centerline $CL_M$ of the cooling hole 108 to facilitate sensing of the geometric profile of the meter portion 124 of the cooling hole 108.

For instance, the rotary table system 220 can tilt the CMC component in: i) a first direction so that the centerline $CL_C$ of the stacked cones 256 of light is off angle with respect to the meter centerline $CL_M$ of the cooling hole 108 to facilitate sensing the geometric profile of a first face of the sidewall 134 defining the meter portion 124 of the cooling hole 108, ii) a second direction opposite the first direction such that the centerline $CL_C$ of the stacked cones 256 of light is off angle with respect to the meter centerline $CL_M$ of the cooling hole 108 to facilitate sensing the geometric profile of a second face of the sidewall 134 defining the meter portion 124 of the cooling hole 108; iii) a third direction perpendicular to the first direction (and thus the second direction as well) such that the centerline $CL_C$ of the stacked cones 256 of light is off angle with respect to the meter centerline $CL_M$ of the cooling hole 108 to facilitate sensing the geometric profile of a third face of the sidewall 134 defining the meter portion 124 of the cooling hole 108; and iv) a fourth direction opposite the third direction such that the centerline $CL_C$ of the stacked cones 256 of light is off angle with respect to the meter centerline $CL_M$ of the cooling hole 108 to facilitate sensing the geometric profile of a fourth face of the sidewall 134 defining the meter portion 124 of the cooling hole 108. Accordingly, the rotary table system 220 can tilt the CMC component in four (4) or more directions to better present certain faces of the sidewall 134 of the meter portion 124 of the cooling hole 108 to the emitted stacked cones 256. In this way, the geometric profile of the meter portion 124 of the cooling hole 108 can more efficiently and accurately be sensed.

More particularly, in some implementations, adjusting, via the rotary table system, the CMC component such that the centerline $CL_C$ of the stacked cones 256 of light is off angle with respect to the meter centerline $CL_M$ of the cooling hole 108 includes tilting, via the rotary table system, the CMC component in a first direction such that the centerline $CL_C$ of the stacked cones 256 of light is off angle with respect to the meter centerline $CL_M$ of the cooling hole 108 and a first face of the sidewall of the cooling hole is presented to the lens of the chromatic confocal sensor. In such implementations, the geometric profile of the first face of the sidewall is sensed as the CMC component is tilted in the first direction.

By way of example, as shown in FIG. 10, the rotary table system 220 can adjust the CMC component in a first direction D1 such that the centerline $CL_C$ of the stacked cones 256 of light is off angle with respect to the meter centerline $CL_M$ of the cooling hole 108 (e.g., by an angle θ1) and a first face 140 of the sidewall 134 of the cooling hole 108 is presented to the lens 252 of the chromatic confocal sensor 251. In this example, the first direction D1 is a forward direction from the perspective of FIG. 10. Notably, the geometric profile of the first face 140 can be more efficiently and accurately sensed when the CMC component is tilted in the first direction D1 as the first face 140 is better presented to the stacked cones 256 of light emitted by the chromatic confocal sensor 251 and light may be better reflected back into the chromatic confocal sensor 251 and ultimately to the CCD 264. Accordingly, the geometric profile of the first face 140 of the sidewall 134 is sensed as the CMC component is tilted in the first direction D1.

In some further implementations, the other faces of the sidewall 134 that define the cooling hole 108 are presented and measured. More specifically, in some implementations, adjusting, via the rotary table system, the CMC component such that the centerline $CL_C$ of the stacked cones 256 of light is off angle with respect to the meter centerline $CL_M$ of the cooling hole 108 further includes tilting, via the rotary table system, the CMC component in a second direction such that the centerline $CL_C$ of the stacked cones 256 of light is off angle with respect to the meter centerline $CL_M$ of the cooling hole 108 and a second face of the sidewall of the cooling hole is presented to the lens 252 of the chromatic confocal sensor 251. The second direction can be opposite the first direction, for example. Moreover, in such implementations, sensing the geometric profile of the meter portion of the cooling hole as the centerline $CL_C$ of the stacked cones 256 of light is off angle with respect to the meter centerline $CL_M$ of the cooling hole 108 includes sensing the geometric profile of the second face of the sidewall as the CMC component is tilted in the second direction.

By way of example, as shown in FIG. 11, the rotary table system 220 can adjust the CMC component in a second direction D2 such that the centerline $CL_C$ of the stacked cones 256 of light is off angle with respect to the meter centerline $CL_M$ of the cooling hole 108 (e.g., by an angle θ2) and a second face 142 of the sidewall 134 of the cooling hole 108 is presented to the lens 252 of the chromatic confocal sensor 251. In this example, the second direction D2 is a direction opposite the first direction D1 from the perspective of FIG. 11. Thus, the second direction D2 is a rearward or backward direction from the perspective of FIG. 10 and is a direction opposite the first direction D1. Notably, the geometric profile of the second face 142 can be more efficiently and accurately sensed when the CMC component is tilted in the second direction D2 as the second face 142 is better presented to the stacked cones 256 of light emitted by the chromatic confocal sensor 251 and light may be better reflected back into the chromatic confocal sensor 251 and ultimately to the CCD 264. Accordingly, the geometric profile of the second face 142 of the sidewall 134 is sensed as the CMC component is tilted in the second direction D2.

In addition, the CMC component can be tilted in other directions as well so that other faces of the sidewall 134 can be better presented to the chromatic confocal sensor 251, and consequently, the geometric profile of such faces can be more efficiently and accurately be sensed. For instance, in some implementations, the method (300) can include tilting, via the rotary table system 220, the CMC component in a third direction such that the centerline $CL_C$ of the stacked cones 256 of light is off angle with respect to the meter centerline $CL_M$ of the cooling hole 108 and a third face of the sidewall of the cooling hole is presented to the lens of the chromatic confocal sensor 251. As one example, the third direction can be perpendicular to the first direction D1 (and consequently the second direction D2 as well). Furthermore, in some implementations, the method (300) can include tilting, via the rotary table system 220, the CMC component in a fourth direction such that the centerline $CL_C$ of the stacked cones 256 of light is off angle with respect to the meter centerline $CL_M$ of the cooling hole 108 and a fourth face of the sidewall of the cooling hole is presented to the lens of the chromatic confocal sensor 251. As one example, the fourth direction can be opposite the third direction and thus perpendicular to the first direction D1 and the second direction D2. In such implementations, in sensing the geometric profile of the meter portion 124 of the cooling hole 108, the geometric profile of the third face of the sidewall 134 is sensed as the CMC component is tilted in the third direction and the geometric profile of the fourth face of the sidewall 134 is sensed as the CMC component is tilted in the fourth direction.

In some implementations, for each of the tilt directions (e.g., the first direction, the second direction, the third direction, the fourth direction, etc.), the rotary table system can adjust the CMC component such that the centerline $CL_C$ of the stacked cones 256 of light emitted is between about three and six degrees (3°-6°) off angle with respect to the centerline of the cooling hole, e.g., meter centerline $CL_M$. In yet other implementations, the rotary table system adjusts the CMC component such that the centerline $CL_C$ of the stacked cones 256 of light is about four degrees (4°) off angle with respect to the meter centerline $CL_M$ of the cooling hole 108. In some further implementations, the rotary table system adjusts the CMC component such that the centerline $CL_C$ of the stacked cones 256 of light is about three degrees (3°) off angle with respect to the meter centerline $CL_M$ of the cooling hole 108. Stated yet another way, for each of the tilt directions, the component can be tilted such that the centerline $CL_C$ defined by the stacked cones 256 of light is between eighty-six and eighty-seven degrees (86°-87°) from perpendicular with respect to the given face of the sidewall 134. In yet other embodiments, for each of the tilt directions, the component can be tilted such that the centerline $CL_C$ defined by the stacked cones 256 of light is between fifty and eighty-seven degrees (50°-87°) from perpendicular with respect to the given face of the sidewall 134.

As will be appreciated in view of the present disclosure, a plurality of measurement points can be collected as the faces of the sidewall 134 defining the meter portion 124 of the cooling hole 108 are sensed, e.g., in a manner described above. By way of example, as shown in FIG. 12, provides a top view of the cooling hole 108 and depicts an example manner in which the chromatic confocal sensor 251 can be moved (e.g., by ram 240 (FIG. 4)) such that the system 200 can collect measurement points 280 representative of the geometric profile of the meter portion 124 of the cooling hole 108.

Particularly, when the CMC component is tilted in the first direction such that the centerline $CL_C$ of the stacked cones 256 of light is off angle with respect to the meter centerline $CL_M$ of the cooling hole 108 and the first face 140 of the sidewall 134 of the cooling hole 108 is presented to the lens 252 of the chromatic confocal sensor 251, the chromatic confocal sensor 251 can be moved in a spiral motion, denoted by the arrow 51, along the first face 140 to collect measurement points 280 representative of a geometric profile of the first face 140 of the sidewall 134 defining the meter portion 124 of the cooling hole 108. Moving the chromatic confocal sensor 251 in a spiral motion 51 allows the chromatic confocal sensor 251 and CCD 264 to capture reflected light and ultimately to collect measurement points 280 in a continuous, predefined manner. Thus, the process is efficient and repeatable. In other example embodiments, the chromatic confocal sensor 251 can be moved in other suitable continuous motions or patterns, such as in a serpentine motion.

Measurement points 280 representative of the geometric profile of the first face 140 can be generated in a manner described above. That is, as the chromatic confocal sensor 251 is moved about in the spiral motion 51 such that the emitted stacked cones 256 directly interact with the first face 140 defining the meter portion 124 of the cooling hole 108, at a particular point, the cone having its apex at the distance of the target surface reflects the highest intensity of light back into the chromatic confocal sensor 251. The reflected light is passed to the CCD 264 (FIG. 5) and the CCD 264 measures one or more characteristics of the reflected light (e.g., the frequency and intensity of the light associated with the cone having its apex at the target surface). The one or more computing devices 270 (FIG. 4) can then determine, based at least in part on the measured frequency and intensity of the light, the distance between the chromatic confocal sensor 251 and the target surface. The distance along with other distance measurements can be applied to the positional scales of the CMM 210 (FIG. 4) to create the 3D measurement points 280. Particularly, the measurement points 280 can be collected in rapid succession at rates between 100 Hz and 1000 Hz while the chromatic confocal sensor 251 moves in a predefined pattern along the first face 140 (e.g., a spiral motion 51). The measurement points 280 are collected or stored in a memory device 274 of the one or more computing devices 270 and a measurement data file can be generated (e.g., by the one or more computing devices 270 (FIG. 4)), which can be used for analysis of the geometry of the CMC component.

As noted previously, the chromatic confocal sensor 251 can collect measurement points 280 on surfaces up to about eighty-seven degrees (87°) from perpendicular to the lens 252 of the chromatic confocal sensor 251, or more stated another way, to the centerline $CL_C$ of the stacked concentric cones 256. This unexpected result can be achieved by taking advantage of small surface roughness irregularities that are produced during machining of the cooling hole 108. The relatively "rough" surface finish of the sidewalls of the cooling hole 108 allow for ample return light reflections from the target surface (e.g., sidewall 134) within the cooling hole 108 to the chromatic confocal sensor 251, which can ultimately be captured by the CCD 264 so that one or more characteristics of the reflected light can be determined. Additionally, silicon dioxide layers produced from laser manufacturing processes can coat the inside of the cooling hole 108, which further reduces the reflectivity of any smooth areas that may be present within the cooling hole 108; thus, silicon dioxide layers also assist in reflecting light back to the lens 252 of the chromatic confocal sensor 251 and ultimately to the CCD 264.

When the CMC component is tilted in the second direction such that the centerline $CL_C$ of the stacked cones 256 of light is off angle with respect to the meter centerline $CL_M$ of the cooling hole 108 and the second face 142 of the sidewall 134 of the cooling hole 108 is presented to the lens 252 of the chromatic confocal sensor 251, the chromatic confocal sensor 251 can be moved in a spiral motion, denoted by the arrow S2, along the second face 142 to collect measurement points 280 representative of a geometric profile of the second face 142 of the sidewall 134. Moving the chromatic confocal sensor 251 in a spiral motion S2 allows the chromatic confocal sensor 251 and CCD 264 to capture reflected light and ultimately to collect measurement points 280 in a continuous, predefined manner. Thus, the process is efficient and repeatable. In other example embodiments, the chromatic confocal sensor 251 can be moved in other suitable continuous motions or patterns. Measurement points 280 representative of the geometric profile of the second face 142 can be generated in the same or similar manner as described above with respect to the first face 140.

When the CMC component is tilted in the third direction such that the centerline $CL_C$ of the stacked cones 256 of light is off angle with respect to the meter centerline $CL_M$ of the cooling hole 108 and the third face 144 of the sidewall 134 of the cooling hole 108 is presented to the lens 252 of the chromatic confocal sensor 251, the chromatic confocal sensor 251 can be moved in a spiral motion, denoted by the arrow S3, along the third face 144 to collect measurement points 280 representative of a geometric profile of the third face 144 of the sidewall 134 defining the meter portion 124 of the cooling hole 108. Measurement points 280 representative of the geometric profile of the third face 144 can be generated in the same or similar manner as described above with respect to the first face 140.

When the CMC component is tilted in the fourth direction such that the centerline $CL_C$ of the stacked cones 256 of light is off angle with respect to the meter centerline $CL_M$ of the cooling hole 108 and the fourth face 146 of the sidewall 134 of the cooling hole 108 is presented to the lens 252 of the chromatic confocal sensor 251, the chromatic confocal sensor 251 can be moved in a spiral motion, denoted by the arrow S4, along the fourth face 146 to collect measurement points 280 representative of a geometric profile of the fourth face 146 of the sidewall 134 defining the meter portion 124 of the cooling hole 108. Measurement points 280 representative of the geometric profile of the fourth face 144 can be generated in the same or similar manner as described above with respect to the first face 140. With measurement points 280 representative of each of the geometric profiles of the faces 140, 142, 144, 146 collected, a geometric profile of the meter portion 124 of the cooling hole 108 can be constructed.

Further, the chromatic confocal sensor can sense the cooling hole, including the diffuser portion and meter portion of the cooling hole, in accordance with or taking into account the determined positional deviation of the cooling hole from its expected position. In this manner, more accurate measurements can be provided by the chromatic confocal sensor.

At (312), the method (300) includes generating a measurement data file based at least in part on the collected measurement data. For instance, the one or more computing devices 270 (FIG. 4) can generate a measurement data file 290 based at least in part on the sensed geometric profile of the diffuser portion 126 (as determined at (308)) and the meter portion 124 of the cooling hole (as determined at (310)). By way of example, as shown in FIG. 13, a measurement data file 290 representative of at least a portion of a geometric profile of the cooling hole 108 is depicted. Particularly, the geometric profiles represented by the collected measurement points 280 of the exterior surface 120, the diffuser portion 126, and the meter portion 124 collectively form a geometric representation of the cooling hole 108. The geometric profile can be used for inspection purposes, measurement purposes, process improvement purposes, among other possibilities. The measurement data file 290 can be a point cloud data file, a mesh data file, or some other suitable measurement data file type.

FIG. 14 provides an example computing system 500 according to example embodiments of the present disclosure. The one or more computing devices 270 described herein can include various components and perform various functions of the one or more computing devices of the computing system 500 described below, for example.

As shown in FIG. 14, the computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, such as operations for processing signals indicative of one or more characteristics of the reflected light, determining a distance from the sensor 251 to the target surface based on the one or more characteristics, generating a measurement data file, etc. as described herein. For instance, the method (300) can be implemented in whole or in part by the computing system 500. Accordingly, the method (300) can be at least partially a computer-implemented method such that at least some of the steps of the method (300) are performed by one or more computing devices, such as the exemplary computing device(s) 510 of the computing system 500. The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include models, databases, etc.

The computing device(s) 510 can also include a network interface 510E used to communicate, for example, with the other components of system 500 (e.g., via a network). The network interface 510E can include any suitable components for interfacing with one or more network(s), including for example, transmitters, receivers, ports, controllers, antennas, and/or other suitable components. One or more external devices can be configured to receive one or more commands or data from the computing device(s) 510 or provide one or more commands or data to the computing device(s) 510.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for collecting measurement data for a cooling hole of a ceramic matrix composite (CMC) component, the method comprising:

adjusting at least one of the CMC component and a chromatic confocal sensor to present the cooling hole to the chromatic confocal sensor;

emitting, via the chromatic confocal sensor, stacked cones of light onto the CMC component;

sensing, via the chromatic confocal sensor, a geometric profile of a diffuser portion of the cooling hole based at least in part on one or more characteristics of light reflected off the CMC component;

adjusting at least one of the CMC component and the chromatic confocal sensor such that a centerline defined by the stacked cones of light emitted by the chromatic confocal sensor is off angle with respect to a centerline of the cooling hole;

sensing, via the chromatic confocal sensor, a geometric profile of a meter portion of the cooling hole as the centerline defined by the stacked cones of light emitted by the chromatic confocal sensor is off angle with respect to the centerline of the cooling hole; and generating, by one or more computing devices, a measurement data file based at least in part on the sensed geometric profile of the diffuser portion and the sensed geometric profile of the meter portion of the cooling hole.

2. The method of claim 1, wherein the CMC component is mounted to a fixture operatively coupled with a rotary table system, and wherein the method further comprises:

lighting, via one or more fixture light sources of the fixture, an internal cavity defined by the CMC component such that the cooling hole is lit internally;

capturing, via an optical camera, one or more images of the cooling hole; and determining, via the one or more computing devices communicatively coupled with the optical camera, a positional deviation of the cooling hole with respect to an expected position of the cooling hole based at least in part on the one or more captured images.

3. The method of claim 2, wherein the chromatic confocal sensor senses the geometric profile of the diffuser portion of the cooling hole and senses the geometric profile of the meter portion based at least in part on the determined positional deviation.

4. The method of claim 1, wherein in adjusting at least one of the CMC component and the chromatic confocal sensor such that the centerline defined by the stacked cones of light is off angle with respect to the centerline of the cooling hole, at least one of the CMC component and the chromatic confocal sensor is adjusted such that the centerline defined by the stacked cones of light emitted is between about three and six degrees (3°-6°) off angle with respect to the centerline of the cooling hole.

5. The method of claim 1, wherein adjusting at least one of the CMC component and the chromatic confocal sensor such that the centerline defined by the stacked cones of light is off angle with respect to the centerline of the cooling hole comprises:

tilting at least one of the CMC component and the chromatic confocal sensor in a first direction such that the centerline defined by the stacked cones of light is off angle with respect to the centerline of the cooling hole and a first face of the sidewall of the cooling hole is presented to the lens of the chromatic confocal sensor, and wherein sensing, via the chromatic confocal sensor, the geometric profile of the meter portion of the cooling hole as the centerline defined by the stacked cones of light is off angle with respect to the centerline of the cooling hole comprises sensing, via the chromatic confocal sensor, the geometric profile of the first face of the sidewall as at least one of the CMC component and the chromatic confocal sensor is tilted in the first direction.

6. The method of claim 5, wherein adjusting at least one of the CMC component and the chromatic confocal sensor such that the centerline defined by the stacked cones of light is off angle with respect to the centerline of the cooling hole further comprises:

tilting at least one of the CMC component and the chromatic confocal sensor in a second direction such that the centerline defined by the stacked cones of light is off angle with respect to the centerline of the cooling hole and a second face of the sidewall of the cooling hole is presented to the lens of the chromatic confocal sensor, and wherein sensing, via the chromatic confocal sensor, the geometric profile of the meter portion of the cooling hole as the centerline defined by the stacked cones of light is off angle with respect to the centerline of the cooling hole comprises sensing, via the chromatic confocal sensor, the geometric profile of the second face of the sidewall as at least one of the CMC component and the chromatic confocal sensor is tilted in the second direction.

7. The method of claim 6, wherein the first direction is opposite the second direction, and wherein adjusting at least one of the CMC component and the chromatic confocal sensor such that the centerline defined by the stacked cones of light is off angle with respect to the centerline of the cooling hole further comprises:

tilting at least one of the CMC component and the chromatic confocal sensor in a third direction extending orthogonal to the first direction such that the centerline defined by the stacked cones of light is off angle with respect to the centerline of the cooling hole and a third face of the sidewall of the cooling hole is presented to the lens of the chromatic confocal sensor; and tilting at least one of the CMC component and the chromatic confocal sensor in a fourth direction opposite the third direction such that the centerline defined by the stacked cones of light is off angle with respect to the centerline of the cooling hole and a fourth face of the sidewall of the cooling hole is presented to the lens of the chromatic confocal sensor, and wherein sensing, via the chromatic confocal sensor, the geometric profile of the meter portion of the cooling hole as the centerline defined by the stacked cones of light is off angle with respect to the centerline of the cooling hole comprises sensing, via the chromatic confocal sensor, the geometric profile of the third face of the sidewall as at least one of the CMC component and the chromatic confocal sensor is tilted in the third direction and the geometric profile of the fourth face of the sidewall as at least one of the CMC component and the chromatic confocal sensor is tilted in the fourth direction.

8. The method of claim 1, wherein adjusting at least one of the CMC component and the chromatic confocal sensor to present the cooling hole to the chromatic confocal sensor comprises adjusting at least one of the CMC component and the chromatic confocal sensor such that the centerline defined by the stacked cones of light emitted by the chromatic confocal sensor is coaxial with the centerline of the cooling hole.

9. The method of claim 8, wherein sensing, via the chromatic confocal sensor, the geometric profile of the diffuser portion of the cooling hole comprises sensing, via the chromatic confocal sensor, the geometric profile of the diffuser portion of the cooling hole as the chromatic confocal sensor is moved in a spiral motion about the centerline of the cooling hole.

10. The method of claim 1, wherein the chromatic confocal sensor is mounted to a ram movable in a plurality of directions, and wherein the one or more computing devices are disposed within or mounted to the ram.

11. A measurement system for collecting measurement data of a cooling feature defined by a component, the measurement system comprising:
   a chromatic confocal sensor operable to emit stacked cones of light, the chromatic confocal sensor having a charged coupled device operable to measure one or more characteristics of light reflected by the component;
   a rotary table system operable to position the component such that the cooling feature is presented to the stacked cones of light emitted from the chromatic confocal sensor;
   a fixture mounted to the rotary table system and operable to retain the component; and
   one or more computing devices communicatively coupled with the charged coupled device, the one or more computing devices configured to:
      receive, from the charged coupled device of the chromatic confocal sensor, a signal indicative of the one or more characteristics of light reflected by the component;
      determine a plurality of measurement points based at least in part on the signal indicative of the one or more characteristics of the light reflected by the component; and
      generate a measurement data file representative of a geometric profile of at least a portion of the cooling feature based at least in part on the plurality of measurement points.

12. The measurement system of claim 11, wherein the component is formed of a ceramic matrix composite (CMC) material.

13. The measurement system of claim 12, wherein the cooling feature is a cooling hole having a diameter less than about 0.65 mm (0.025 inches).

14. The measurement system of claim 11, wherein the cooling feature is a cooling hole, and wherein the cooling hole defines a centerline and has a diffuser portion, and wherein the one or more computing devices are further configured to:
   cause the rotary table system to position the component so that the cooling feature is presented to the stacked cones of light emitted from the chromatic confocal sensor and so that the centerline of the cooling hole is parallel or substantially parallel with a centerline defined by the stacked cones of light; and
   cause the chromatic confocal sensor to move about the cooling hole so that the signal indicative of the one or more characteristics of light reflected by the component is representative of a geometric profile of the diffuser portion of the cooling hole.

15. The measurement system of claim 14, wherein the cooling hole defines a centerline and has a meter portion, and wherein the one or more computing devices are further configured to:
   cause the rotary table system to position the component so that the centerline of the stacked cones of light is off angle with respect to the centerline of the cooling hole in:
      i) a first direction so that a first face of the cooling hole is presented to the stacked cones of light emitted from the chromatic confocal sensor;
      ii) a second direction opposite the first direction so that a second face opposite the first face of the cooling hole is presented to the stacked cones of light emitted from the chromatic confocal sensor;
      iii) a third direction perpendicular to the first direction so that a third face of the cooling hole is presented to the stacked cones of light emitted from the chromatic confocal sensor; and
      iv) a fourth direction opposite the third direction so that a fourth face of the cooling hole is presented to the stacked cones of light emitted from the chromatic confocal sensor; and
   cause the chromatic confocal sensor to move so that the signal indicative of the one or more characteristics of light reflected by the component is representative of a geometric profile of the meter portion of the cooling hole.

16. The measurement system of claim 15, wherein in causing the chromatic confocal sensor to move so that the signal indicative of the one or more characteristics of light reflected by the component is representative of the geometric profile of the meter portion of the cooling hole, the one or more computing devices are configured to:
   cause the chromatic confocal sensor to move:
      i) in a spiral motion along the first face when the centerline of the stacked cones of light is off angle from the centerline of the cooling hole in the first direction;
      ii) in a spiral motion along the second face when the centerline of the stacked cones of light is off angle from the centerline of the cooling hole in the second direction;
      iii) in a spiral motion along the third face when the centerline of the stacked cones of light is off angle from the centerline of the cooling hole in the third direction, and
      iv) in a spiral motion along the fourth face when the centerline of the stacked cones of light is off angle from the centerline of the cooling hole in the fourth direction.

17. The measurement system of claim 11, wherein a fiber optic cable communicatively couples the charged coupled device and at least one of the one or more computing devices, and wherein the fiber optic cable is less than about three meters.

18. The measurement system of claim 11, wherein the fixture has one or more fixture light sources operable to light an internal cavity defined by the component, and wherein the measurement system further comprises:
   an optical camera communicatively coupled with the one or more computing devices and operable to capture one or more images of the cooling feature of the component, and
   wherein the one or more computing devices are further configured to:
      receive, from the optical camera, a signal indicative of the one or more captured images; and determine a positional deviation of the cooling feature with respect to an expected position of the cooling feature based at least in part on the one or more captured images, and wherein the chromatic confocal sensor senses the geometric profile of the cooling feature based at least in part on the determined positional deviation.

19. A method, comprising:

determining a centerline of a cooling hole defined by a component of a gas turbine engine;

adjusting a position of at least one of the component and a chromatic confocal sensor such that a lens of the chromatic confocal sensor is substantially perpendicular to the determined centerline of the cooling hole;

emitting, via the chromatic confocal sensor, stacked cones of light onto the component;

tilting at least one of the component and the chromatic confocal sensor in one or more directions such that in each direction the at least one of component and the chromatic confocal sensor is tilted the lens is off angle from perpendicular with respect to the centerline of the cooling hole to present an associated face of a sidewall of the cooling hole;

moving, for each of the one or more directions, the stacked cones of light emitted by the chromatic confocal sensor about the associated face to sense a geometric profile of the cooling hole; and generating a measurement data file based at least in part on the sensed geometric profile of the cooling hole.

20. The method of claim 19, wherein in tilting the at least one of the component and the chromatic confocal sensor such that the lens is off angle from perpendicular with respect to the centerline of the cooling hole in one of the one or more directions to present the associated face of the sidewall of the cooling hole to the chromatic confocal sensor, at least one of the component and the chromatic confocal sensor is tilted such that a centerline defined by the stacked cones of light is between fifty and eighty-seven degrees (50-87°) from perpendicular with respect to the associated face of the sidewall.

* * * * *